United States Patent
Francis

(10) Patent No.: US 10,989,621 B1
(45) Date of Patent: Apr. 27, 2021

(54) ONLINE PIPE INTEGRITY TESTING SYSTEM AND METHOD

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/998,018

(22) Filed: Aug. 20, 2020

(51) Int. Cl.
| | |
|---|---|
| *G01N 17/04* | (2006.01) |
| *G01M 3/28* | (2006.01) |
| *F17D 5/02* | (2006.01) |
| *F17D 3/00* | (2006.01) |
| *G01F 22/02* | (2006.01) |

(52) U.S. Cl.
CPC .............. *G01M 3/2815* (2013.01); *F17D 3/00* (2013.01); *F17D 5/02* (2013.01); *G01F 22/02* (2013.01); *G01N 17/04* (2013.01)

(58) Field of Classification Search
CPC .......... G01M 3/2815; F17D 3/00; F17D 5/02; G01F 22/02; G01N 17/04
USPC .......................................................... 702/51
See application file for complete search history.

(56) References Cited

U.S. PATENT DOCUMENTS

| | | | | |
|---|---|---|---|---|
| 4,007,719 | A * | 2/1977 | Brettschneider | ........ F02D 21/10 |
| | | | | 123/687 |
| 2011/0153225 | A1* | 6/2011 | Mangal | ............... G01M 3/2815 |
| | | | | 702/24 |
| 2014/0299111 | A1* | 10/2014 | Denz | ................ F02M 35/10157 |
| | | | | 123/521 |
| 2018/0320826 | A1 | 11/2018 | Ethridge et al. | |

FOREIGN PATENT DOCUMENTS

GB            2483823 A        3/2012

* cited by examiner

*Primary Examiner* — Toan M Le
*Assistant Examiner* — Xiuqin Sun
(74) *Attorney, Agent, or Firm* — Conrad J. Hsu

(57) ABSTRACT

Techniques for implementing and/or operating a pipeline system including a pipe segment, in which the pipe segment includes tubing that defines a pipe bore and fluid conduits in a tubing annulus, a pipe fitting secured to the pipe segment, in which the pipe fitting includes a vent port connected to the fluid conduits in the tubing annulus, and a testing apparatus. The testing apparatus includes a fluid valve connected to the vent port, an upstream sensor fluidly connected between the vent port and the fluid valve, in which the upstream sensor determines a fluid parameter associated with fluid within the fluid conduits in the tubing annulus, and a downstream sensor connected between the fluid valve and external environmental conditions, in which the downstream sensor determines another fluid parameter associated with fluid released from the fluid conduits in the tubing annulus while the fluid valve is in an opened state.

18 Claims, 10 Drawing Sheets

ONLINE PIPE INTEGRITY TESTING SYSTEM AND METHOD

BACKGROUND

The present disclosure generally relates to pipeline systems and, more particularly, to a testing apparatus that may facilitate determining an integrity state of a pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

However, at least in some instances, the presence of one or more faults (e.g., defects), such as a breach, an obstruction (e.g., blockage), a kink, and/or a dent, in the tubing of a pipe segment may affect (e.g., reduce and/or compromise) its integrity and, thus, its ability to provide isolation (e.g., insulation). In other words, at least in some instances, operating a pipeline system while a pipe segment deployed therein has an integrity compromising fault may affect (e.g., reduce) operational efficiency and/or operational reliability of the pipeline system, for example, due to the fault resulting in conveyed fluid being lost and/or contaminated by external environmental conditions. As such, to facilitate improving pipeline system operational efficiency and/or operational reliability, the integrity of a pipeline system may be tested.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a pipe segment, in which the pipe segment includes tubing that defines a pipe bore through the pipe segment and one or more fluid conduits in a tubing annulus of the pipe segment, a pipe fitting secured to the pipe segment, in which the pipe fitting includes a vent port fluidly connected to the one or more fluid conduits in the tubing annulus of the pipe segment, and a testing apparatus. The testing apparatus includes a fluid valve fluidly connected to the vent port on the pipe fitting, an upstream sensor fluidly connected between the vent port on the pipe fitting and the fluid valve, in which the upstream sensor determines a fluid parameter associated with fluid within the one or more fluid conduits in the tubing annulus of the pipe segment to facilitate determining an integrity state of the pipe segment, and a downstream sensor fluidly connected between the fluid valve and external environmental conditions, in which the downstream sensor determines another fluid parameter associated with fluid released from the one or more fluid conduits in the tubing annulus of the pipe segment while the fluid valve is in an opened state to facilitate determining the integrity state of the pipe segment.

In another embodiment, a method of operating a pipeline system, including determining, using a control sub-system in the pipeline system, a first tubing annulus fluid parameter set that includes one or more fluid parameters associated with fluid present within free space in a tubing annulus of a pipe segment deployed in the pipeline system based at least in part on sensor data determined by a testing apparatus in the pipeline system while a fluid valve in the testing apparatus is in a closed state; transitioning the fluid valve in the testing apparatus from the closed state to an opened state to release fluid from the free space in the tubing annulus of the pipe segment; determining, using the control sub-system, a released fluid parameter set that includes one or more fluid parameters associated with fluid released from the free space in the tubing annulus of the pipe segment based at least in part on sensor data determined by the testing apparatus while the fluid valve in the testing apparatus is in the opened state; transitioning the fluid valve in the testing apparatus from the opened state back to the closed state; determining, using the control sub-system, a second tubing annulus fluid parameter set that includes one or more fluid parameters associated with fluid present within the free space in the tubing annulus of the pipe segment based at least in part sensor data determined by the testing apparatus after the fluid valve in the testing apparatus is transitioned from the opened state back to the closed state; and determining, using the control sub-system, an integrity state of the pipeline system based at least in part on the first tubing annulus fluid parameter set, the released fluid parameter set, and the second tubing annulus fluid parameter set.

In another embodiment, A testing apparatus in a pipeline system includes an actively-operated fluid valve to be fluidly connected to a first vent port on a pipe fitting in the pipeline system, in which the first vent port on the pipe fitting is configured to be fluidly connected to free space in a tubing annulus of a pipe segment deployed in the pipeline system, a passively-operated fluid valve to be fluidly connected to a second vent port on the pipe fitting, in which the second vent port on the pipe fitting is to be fluidly connected to the free space in the tubing annulus of the pipe segment, a first one or more sensors fluidly connected upstream of the passively-operated fluid valve, in which the first one or more sensors determine first sensor data indicative of one or more fluid parameters associated with fluid within the free space in the tubing annulus of the pipe segment, a second one or more sensors fluidly connected downstream of the actively-operated fluid valve and the passively-operated fluid valve, in which the second one or more sensors determine second sensor data indicative of one or more fluid parameters associated with fluid released from the free space in the tubing annulus of the pipe segment while the actively-operated fluid valve or the passively-operated fluid valve is in an open state, and a control sub-system communicatively coupled to the actively-operated fluid valve, the first one or more sensors, and the second one or more sensors, in which the control sub-system determines an integrity state of the pipeline system based at least in part on the first sensor data determined by the first one or more sensors and the second sensor data determined by the second one or more sensors.

DETAILED DESCRIPTION

Figure 1:
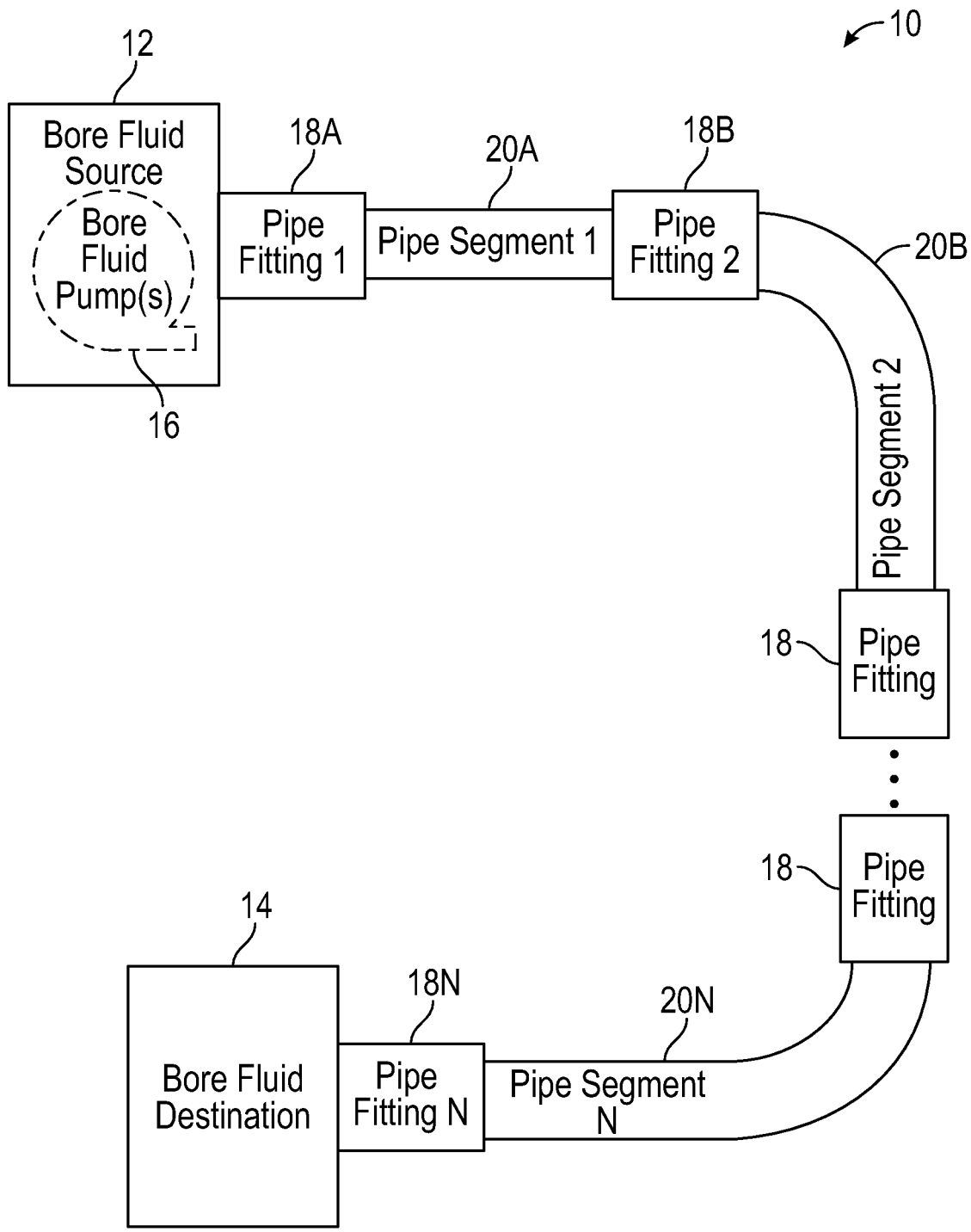
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments.

More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate providing fluid isolation, in some instances, the tubing of a pipe segment may be implemented with multiple layers. For example, the tubing of a pipe segment may include an inner barrier (e.g., liner) layer and an outer barrier (e.g., shield or sheath) layer that each run (e.g., span) the length of the pipe segment. To facilitate blocking fluid flow directly therethrough, the inner barrier layer and the outer barrier layer may each be a continuous layer of solid material, such as plastic and/or a composite material, that runs the length of the pipe segment—although, at least in some instances, fluid from the pipe bore may nevertheless gradually permeate through the inner barrier layer and/or fluid from external environmental conditions may nevertheless gradually permeate through the outer barrier layer.

In some instances, the tubing of a pipe segment may additionally include one or more intermediate layers implemented between its inner barrier layer and its outer barrier layer, for example, to facilitate improving tensile strength and/or hoop strength of the pipe segment tubing. Additionally, to facilitate improving deployment (e.g., installation) efficiency, in some instances, an intermediate layer of pipe segment tubing may include solid material, such as metal and/or a composite material, as well as one or more gaps devoid of solid material. For example, the intermediate layer may include solid material helically wrapped (e.g., wound) on the inner layer of pipe segment tubing to facilitate defining a helically-shaped gap that runs along the pipe segment tubing. In other words, in such instances, the annulus of the pipe segment tubing may include free space (e.g., helically shaped gap) in which solid material is not implemented. Due to the reduced amount of solid material, at least in some instances, implementing an intermediate layer of pipe segment tubing to include free space may facilitate improving flexibility of the pipe segment, for example, to facilitate reducing its minimum bend radius (MBR). In fact, at least in some instances, a flexible pipe segment may be spooled (e.g., on a reel and/or in a coil) and, thus, increasing its flexibility may facilitate improving deployment efficiency, for example, by enabling the pipe segment to be transported and/or deployed using a tighter spool.

Nevertheless, in some instances, one or more faults (e.g., defects), such as a breach, a kink, an obstruction (e.g., blockage), and/or a dent, in the tubing of a pipe segment may affect (e.g., compromise and/or reduce) its integrity and, thus, its ability to provide isolation (e.g., insulation) between the pipe bore of the pipe segment and environmental conditions external to the pipe segment. For example, a fault on the tubing of a pipe segment may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has an integrity-compromising fault may affect (e.g., reduce) operational efficiency and/or operational reliability of the pipeline system, for example, due to the fault resulting in conveyed fluid being lost and/or contaminated by external environmental conditions.

Accordingly, to facilitate improving pipeline operational efficiency and/or pipeline operational reliability, the present disclosure provides techniques for implementing and/or operating a testing apparatus in a pipeline system to facilitate determining an integrity state of a pipe segment deployed in the pipeline system and, thus, an integrity state of the pipeline system online during operation of the pipeline system. As mentioned above, at least in some instances, fluid may gradually permeate through the inner barrier layer and/or the outer barrier layer of a pipe segment and, thus, into free space within the tubing annulus of the pipe segment. To facilitate venting the tubing annulus, a pipe fitting secured to the pipe segment may include a tubing cavity, which is implemented to interface with the tubing of the pipe segment, and one or more vent ports, which are each fluidly connected to the tubing cavity.

Additionally, to facilitate testing integrity of a pipe segment, the pipeline system may include a testing apparatus, which includes sensors and one or more fluid valves. In particular, the testing apparatus may include a fluid valve, which is fluidly connected to a vent port on a pipe fitting in the pipeline system. The testing apparatus may additionally include one or more sensors, such as a fluid pressure sensor and/or a fluid temperature sensor, that are each fluidly connected to the vent port upstream of the fluid valve. In addition to one or more upstream sensors, the testing apparatus may include one or more sensors, such as a flow meter and/or a fluid composition analyzer, that are each fluidly connected to the vent port downstream of the fluid valve. In other words, a downstream sensor in the testing apparatus may determine sensor data indicative of a fluid parameter associated with fluid in a tubing annulus of a pipe segment while the fluid valve is in its opened state whereas an upstream sensor in the testing apparatus may determine sensor data indicative of a fluid associated with the fluid in the tubing annulus of the pipe segment regardless of whether the fluid valve is its opened state or its closed state.

Furthermore, in some embodiments, a fluid valve in a testing apparatus may be an actively-operated fluid valve, such as a solenoid fluid valve, for example, which operates (e.g., opens and/or closes) based at least in part on control signals received from a control sub-system. Additionally or alternatively, in some embodiments, a fluid valve in a testing apparatus may be a passively-operated fluid valve, such as a relief fluid valve. For example, a passively-operated fluid valve in the testing apparatus may automatically transition from its closed state to its open state when fluid pressure at its input side reaches a relief (e.g., upper) pressure threshold and automatically transition from its open state back to its closed state when the fluid pressure at its input side drops below a lower pressure threshold. In fact, in some embodiments, a testing apparatus may include an actively-operated fluid valve as well as a passively-operated fluid valve. In particular, in some such embodiments, the actively-operated fluid valve may be fluidly connected to a first vent port on a pipe fitting while the passively-operated fluid valve may be fluidly connected to a second (e.g., different) vent port on the pipe fitting, for example, such that a fluid pressure sensor and/or a fluid temperature sensor are fluidly connected between the second vent port and the passively-operated fluid valve.

In any case, based at least in part on sensor data determined by one or more sensors in a testing apparatus of a pipeline system, a control sub-system in the pipeline system may determine an integrity state of a pipe segment deployed in the pipeline system and, thus, an integrity state of the pipeline system. Merely as an illustrative non-limiting example, the control sub-system may determine that a breach is potentially present in the outer barrier layer of the pipe segment when it determines that the sensor data is indicative of the percentage of external environmental fluid present in fluid released from the tubing annulus of the pipe segment being greater than a threshold environmental fluid percentage, for example, which is set based at least in part on the permeation rate of external environmental fluid through the outer barrier layer that is expected to occur when a fault is not present. Similarly, the control sub-system may determine that a breach is potentially present in the inner barrier layer of the pipe segment when it determines that the sensor data is indicative of the percentage of bore fluid present in the fluid released from the tubing annulus of the pipe segment being greater than a threshold bore fluid percentage, for example, which is set based at least in part on the permeation rate of bore fluid through the inner barrier layer that is expected to occur when a fault is not present. Additionally or alternatively, the control sub-system may determine that the tubing of the pipe segment is potentially suffering from corrosion when it determines that the sensor data is indicative of the fluid released from the tubing annulus including corrosive fluid, such as hydrogen sulfide ($H_2S$), and/or a corrosion byproduct, such as hydrated iron(III) oxide ($Fe_2O3.nH_2O$) and/or iron(III) oxide-hydroxide ($Fe(OH)_3$).

Furthermore, as mentioned above, in some embodiments, a fluid valve in a testing apparatus may be implemented and/or operated to transition from its closed state to its open state when fluid pressure at its input side reaches a relief (e.g., upper) pressure threshold and to transition from its open state back to its closed state when the fluid pressure at its input side drops below a lower pressure threshold. Thus, in some such embodiments, a control sub-system in a pipeline system may determine an integrity state of a pipe segment deployed in the pipeline system based at least in part on sensor data determined by the testing apparatus to be indicative of the fluid pressure present within the tubing annulus of the pipe segment. Merely as an illustrative non-limiting example, the control sub-system may determine that a breach (e.g., fault) is potentially present in the tubing of the pipe segment or an obstruction (e.g., fault) is potentially present in the tubing annulus of the pipe segment when it determines that the sensor data is indicative of the fluid pressure within the tubing annulus not reaching the relief pressure threshold before a duration threshold (e.g., set based at least in part on the permeation rate of fluid into the tubing annulus that is expected to occur when a fault is not present) elapses.

Moreover, in some embodiments, based at least in part on the sensor data determined by a testing apparatus in a pipeline system, a control sub-system in the pipeline system may additionally or alternatively determine whether the free space in the tubing annulus of a pipe segment deployed in the pipeline system is inadvertently obstructed, for example, by liquid pooling in the free space, the outer barrier layer of the pipe segment collapsing into the free space, and/or the inner barrier layer of the pipe segment expanding into the free space. To facilitate determining whether the free space in the tubing annulus is inadvertently obstructed, while a fluid valve in the testing apparatus is in its closed state, the one or more sensors in the testing apparatus that are implemented upstream of the fluid valve may determine a first tubing annulus fluid parameter set, for example, which includes a first fluid pressure and/or a first fluid temperature present in the tubing annulus of the pipe segment. The fluid valve may then be transitioned from its closed state to its opened state to enable fluid within the free space in the tubing annulus to be released therefrom, for example, based on a control signal received from a control sub-system and/or automatically in response to an associated relief pressure threshold being reached.

While the fluid valve in the testing apparatus is in its opened state, a flow meter in the testing apparatus may measure the volume of fluid released from the tubing annulus of the pipe segment. Additionally, in some embodiments, a fluid composition analyzer in the testing apparatus may determine the composition of the fluid released from the tubing annulus of the pipe segment. In fact, to facilitate improving determination accuracy, in some embodiments, the flow meter may adjust its fluid volume determination based at least in part on the fluid composition determined by the fluid composition analyzer.

In any case, the fluid valve in the testing apparatus may then be transitioned from its opened state to its closed state, for example, based on a control signal received from a control sub-system and/or automatically in response to an associated lower pressure threshold being reached. While the fluid valve is in its closed state, the one or more sensors in the testing apparatus that are implemented upstream of the fluid valve may determine a second tubing annulus fluid parameter set, for example, which includes a second fluid pressure and/or a second fluid temperature present in the tubing annulus of the pipe segment. In other words, in this manner, the testing apparatus may determine sensor data, which indicates that the release of the measured fluid volume from the tubing annulus results in a fluid parameter associated with the fluid present in the tubing annulus changing from a first value in the first tubing annulus fluid parameter set to a second value in the second tubing annulus fluid parameter set.

As such, based at least in part on the sensor data determined by a testing apparatus in a pipeline system, a control sub-system in the pipeline system may determine the volume of free space that is present in the tubing annulus of a pipe segment deployed in the pipeline system. Merely as an illustrative non-limiting example, when fluid temperature remains constant, the control sub-system may determine that the volume of the free space in the tubing annulus is the measured fluid volume multiplied by a ratio of the second (e.g., subsequent) fluid pressure to the difference between the first (e.g., previous) fluid pressure and the second fluid pressure, for example, due to Boyle's law. When fluid temperature changes, the control sub-system may nevertheless determine the volume of the free space in the tubing annulus, for example, in accordance with the combined gas law.

In any case, in some embodiments, the volume of the free space in the tubing annulus of a pipe segment may be periodically redetermined. In particular, in some such embodiments, a control sub-system may determine that the free space in the tubing annulus of the pipe segment is potentially obstructed when the free space volume determined at a current time is greater than the free space volume determined at a previous time, for example, by more than an difference threshold that facilitates accounting for measurement (e.g., sensor) error. Additionally or alternatively, the control sub-system may determine that the pipe segment potentially has a breach when the free space volume determined at a current time is greater than the free space volume determined at a previous time, for example, by more than a difference threshold that facilitates accounting for measurement (e.g., sensor) error. Furthermore, the control sub-system may determine that pipe segment potentially has a fault (e.g., breach or obstruction) when a currently determined free space volume differs from an expected (e.g., target and/or theoretical) free space volume, for example, by more than a difference threshold that facilitates accounting for measurement (e.g., sensor) error. In this manner, a testing apparatus in a pipeline system may be implemented and/or operated to facilitate testing the integrity of a pipe segment deployed in the pipeline system online during operation of the pipeline system, which, at least in some instances, may facilitate further improving operational efficiency and/or operational reliability of the pipeline system, for example, by enabling a fault that occurs in the pipe segment after initial deployment into the pipeline system to be detected and ameliorated.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit (e.g., free space) in the annulus of the tubing, which is separate from the pipe bore. In other words, in such embodiments, fluid may flow through a pipe segment 20 via its pipe bore, a fluid conduit implemented within its tubing annulus, or both.

Figure 2:
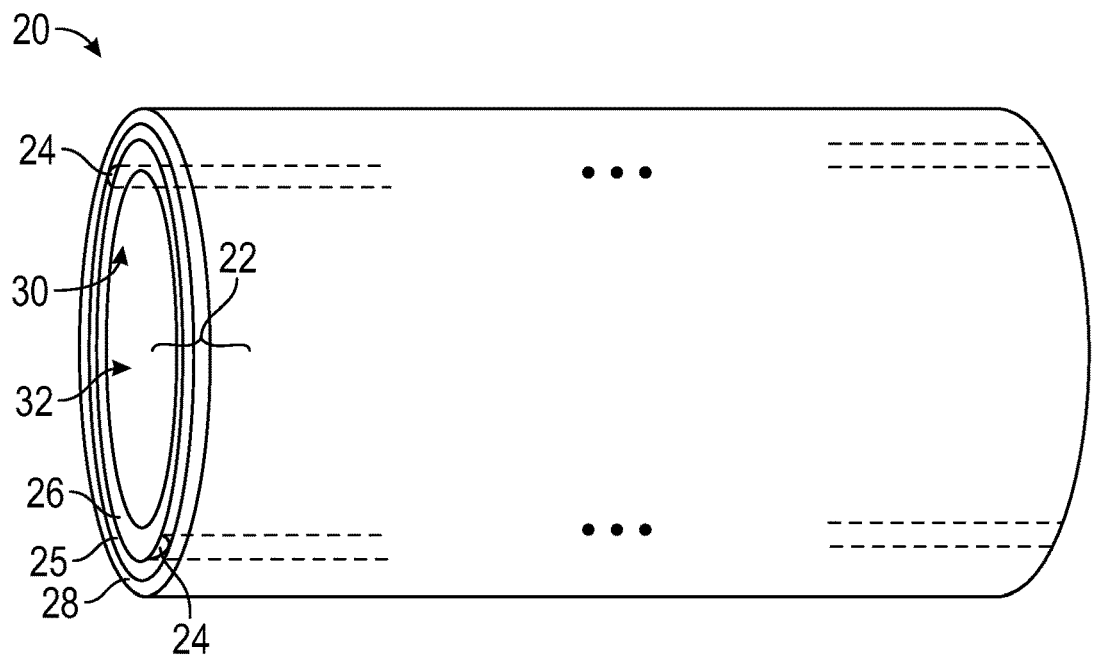
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits (e.g., free space) 24 implemented in its annulus 25, is shown in FIG. 2. As depicted, the pipe segment tubing 22 is implemented with multiple layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
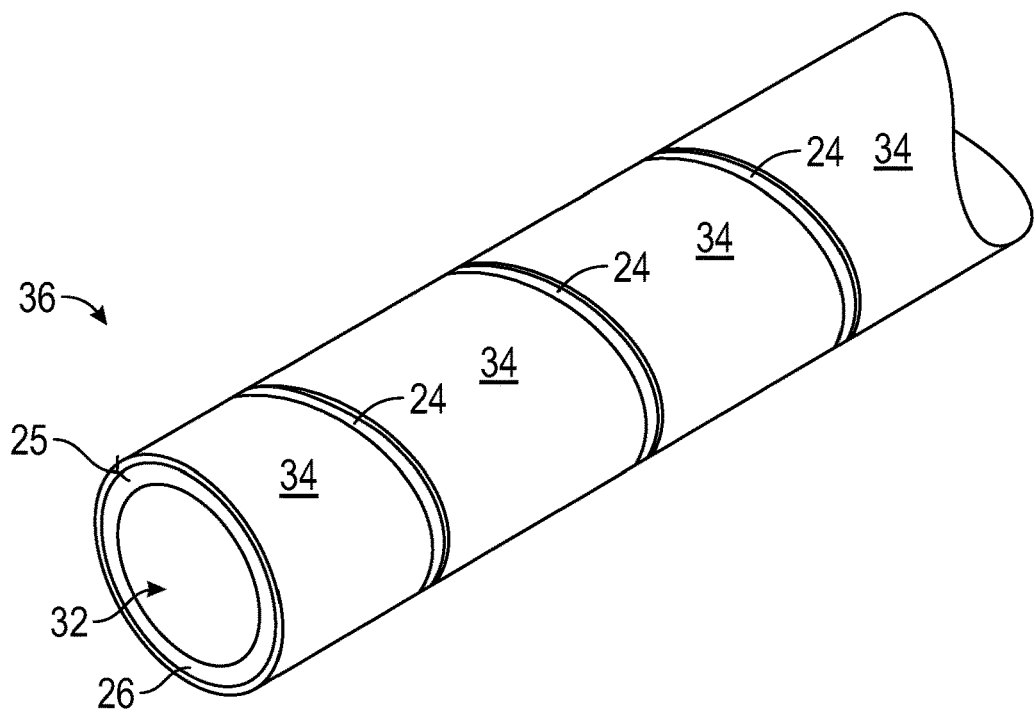
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., test and/or return) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, as described above, the tubing 22 of a pipe segment 20 may generally be implemented to facilitate isolating conditions within a pipe bore 32 of the pipe segment 20 from environmental conditions external to the pipe segment 20. However, even when implemented with multiple layers, in some instances, a fault (e.g., defect), such as a breach, a kink, an obstruction (e.g., blockage), and/or a dent, in pipe segment tubing 22 may compromise its integrity and, thus, its ability to provide isolation, for example, due to the defect resulting in excessive (e.g., undesired) fluid flow from the pipe segment directly out into environmental conditions external to the pipe segment 20 and/or from the external environmental conditions directly into the pipe segment 20. As such, at least in some instances, operating a pipeline system 10 while pipe segment tubing 22 deployed therein has an integrity compromising defect may affect (e.g., reduce) operational efficiency and/or operational reliability of the pipeline system 10, for example, due to the defect resulting in conveyed fluid being lost and/or contaminated by external environmental conditions. As such, to facilitate improving pipeline operational efficiency and/or operational reliability, a pipeline system 10 may include a testing apparatus, which is implemented and/or operated to facilitate determining an integrity state a pipe segment 20 deployed in the pipeline system 10 and, thus, an integrity state of the pipeline system 10, for example, online during operation of the pipeline system 10.

Figure 4:
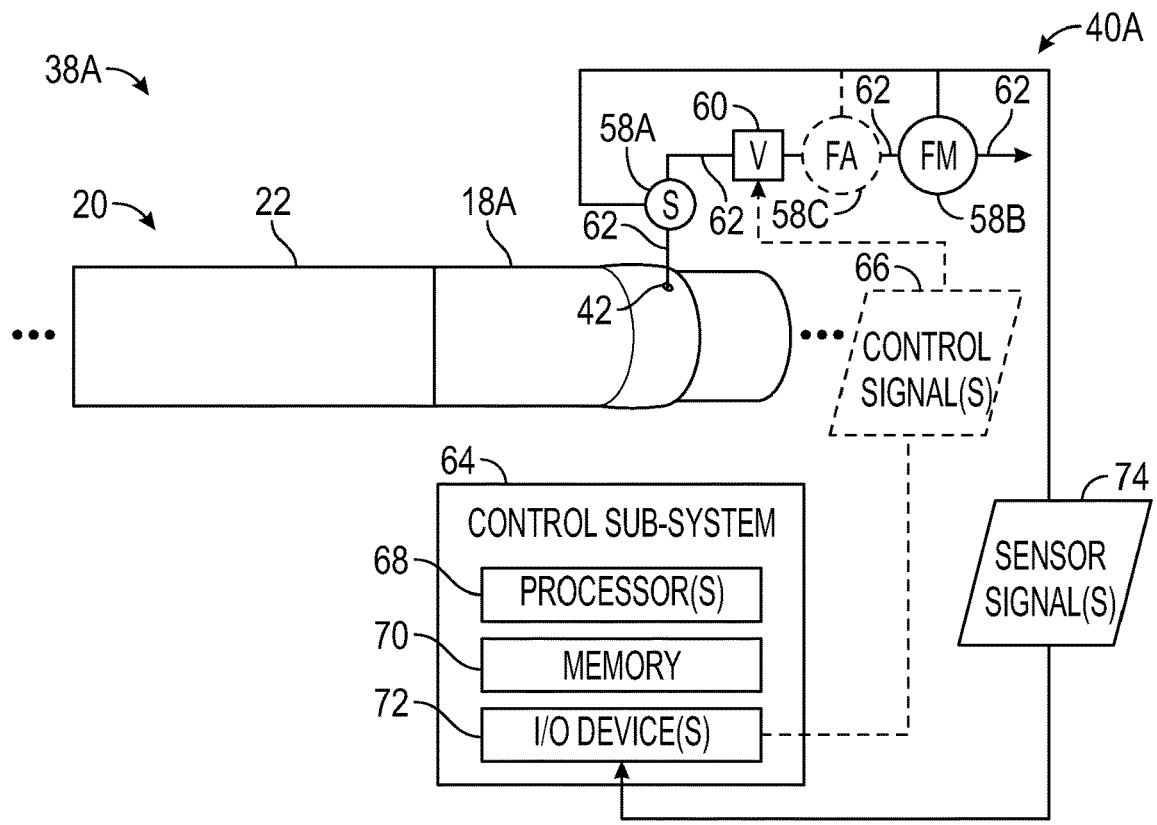
FIG. 4 is a block diagram of an example of a portion of the pipeline system of FIG. 1, which includes a testing apparatus, a pipe segment, and a pipe fitting, in accordance with an embodiment of the present disclosure.

To help illustrate, an example of a portion 38A of a pipeline system 10, which includes a testing apparatus 40A, is shown in FIG. 4. As depicted, in addition to the testing apparatus 40A, the portion 38A of the pipeline system 10 includes a pipe segment 20 secured in a pipe fitting 18A. Although obfuscated from view, as described above, the tubing 22 of the pipe segment 20 may include one or more fluid conduits (e.g., free space) 24 implemented in the annulus 25 of the pipe segment tubing 22. Additionally, as described above, at least in some instances, fluid may gradually permeate through the inner barrier layer 26 and/or the outer barrier layer 28 of pipe segment tubing 22 and, thus, collect in the annulus 25 of the pipe segment tubing 22. However, at least in some instances, the continuous buildup of fluid in the tubing annulus 25 of a pipe segment 20 may produce a fault in the tubing 22 of the pipe segment 20, for example, due to the built-up fluid corroding the pipe segment tubing 22 and/or the resulting fluid pressure in the tubing annulus 25 producing a breach in the pipe segment tubing 22.

Thus, to facilitate reducing the likelihood of fluid present in the annulus 25 of pipe segment tubing 22 causing a fault in the pipe segment tubing 22, as in the depicted example, a pipe fitting 18 secured to the pipe segment tubing 22 may include one or more vent ports 42. As mentioned above, a pipe segment 20 may generally be secured to a pipe fitting 18 at least in part by securing its pipe segment tubing 22 within the pipe fitting 18. In particular, as will be described in more detail below, the pipe fitting 18 may include a tubing cavity, which is implemented to have pipe segment tubing 22 secured therein and, thus, to be fluidly connected to one or more fluid conduits (e.g., free space) 24 implemented in the annulus 25 of the pipe segment tubing 22. In other words, to facilitate venting fluid collected within the tubing annulus 25 of the pipe segment 20, the pipe fitting 18 may be implemented such that its vent port 42 is fluidly connected to its tubing cavity.

Figure 5:
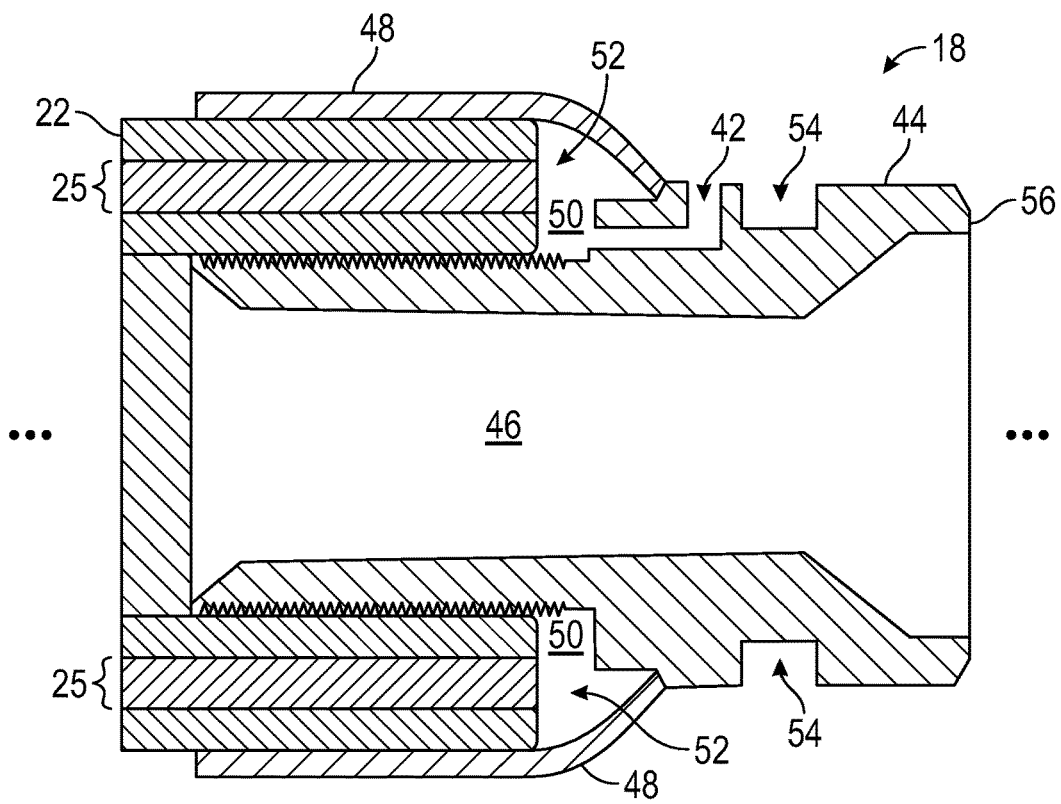
FIG. 5 is cross-sectional view of an example of the pipe segment and the pipe fitting of FIG. 4, in accordance with an embodiment of the present disclosure.

To help illustrate, an example of pipe segment tubing 22 disposed within a pipe fitting 18 is shown in FIG. 5. As depicted, the pipe fitting 18 includes a fitting body 44, which defines (e.g., encloses) a fitting bore 46 through the pipe fitting 18. Additionally, as depicted, the pipe fitting 18 includes a fitting jacket 48 secured circumferentially around the fitting body 44, thereby defining a tubing cavity 50 between an inner surface of the fitting jacket 48 and an outer surface of the fitting body 44.

Furthermore, as depicted, the pipe segment tubing 22 is disposed within the tubing cavity 50 of the pipe fitting 18. In particular, as depicted, an open end 52 of the annulus 25 of the pipe segment tubing 22 is disposed within the tubing cavity 50. In other words, when the pipe segment tubing 22 is secured in the pipe fitting 18, the tubing cavity 50 of the pipe fitting 18 may be fluidly connected to one or more fluid conduits (e.g., free space) 24 in the annulus 25 of the pipe segment tubing 22.

In some embodiments, a pipe fitting 18 may be secured to a pipe segment 20 using swaging techniques, for example, which conformally deform a fitting jacket 48 of the pipe fitting around the tubing 22 of the pipe segment 20 via a swage machine. To facilitate securing a swage machine thereto, as in the depicted example, in some embodiments, the fitting body 44 of a pipe fitting 18 may include a grab notch 54, which is implemented to matingly interlock with a grab tab on a swage machine. Moreover, as in the depicted example, to facilitate fluidly connecting a pipe segment 20 secured thereto to another pipeline component (e.g., a bore fluid source 12, a bore fluid destination 14, or another pipe fitting 18), in some embodiments, a pipe fitting 18 may include a weld neck 56 opposite the fitting jacket 48. In other words, in such embodiments, the pipe fitting 18 may be a pipe end fitting 18.

However, it should be appreciated that the depicted example is merely intended to be illustrative and not limiting. In particular, in other embodiments, a pipe fitting 18 with one or more vent ports 42 may be midline pipe fitting 18 and, thus, may include another fitting jacket 48 instead of a weld neck 56. Additionally or alternatively, a pipe fitting 18 may not include a grab notch 54.

In any case, as depicted, a vent port 42 on the pipe fitting 18 is fluidly connected to the tubing cavity 50 in the pipe fitting 18. However, it should again be appreciated that the depicted example is merely intended to be illustrative and not limiting. In particular, in other embodiments, a vent port 42 may be implemented in a fitting jacket 48 of a pipe fitting 18, for example, instead of in the fitting body 44 of the pipe fitting 18. Additionally or alternatively, as will be described in more detail below, a pipe fitting 18 may be implemented with multiple vent ports 42. In any case, implementing a pipe fitting 18 in this manner may enable a vent port 42 of the pipe fitting 18 to be fluidly connected to one or more fluid conduits (e.g., free space) 24 in the tubing annulus 25 of a pipe segment 20 that is secured thereto.

Thus, to facilitate determining the integrity state of a pipe segment 20 and, thus, a pipeline system 10 in which the pipe segment 20 is deployed, as in the example depicted in FIG. 4, a testing apparatus 40 in the pipeline system 10 may include sensors 58 and one or more fluid valves 60. In particular, as depicted, the testing apparatus 40A includes one or more sensors 58A, such as a fluid pressure sensor 58 and/or a fluid temperature sensor 58, that are fluidly connected between the vent port 42 of the pipe fitting 18A and a fluid valve 60 in the testing apparatus 40A via one or more external fluid conduits 62, such as a hose. Additionally, as depicted, the testing apparatus 40A includes one or more sensors 58, such as a flow meter 58B and/or a fluid composition analyzer 58C, that are fluidly connected between the fluid valve 60 and external environmental conditions via one or more external fluid conduits 62, such as a hose. In other words, as in the depicted example, a testing apparatus 40 may include one or more sensors 58A implemented upstream of a fluid valve 60 as well as one or more sensors 58 implemented downstream of the fluid valve 60.

That is, implementing a testing apparatus 40 in this manner may enable its one or more upstream sensors 58A to determine sensor data indicative of one or more fluid parameters present in the tubing cavity 50 of a pipe fitting 18 and, thus, one or more fluid conduits (e.g., free space) 24 in the tubing annulus 25 of a pipe segment 20 that is secured to the pipe fitting 18 independent of a fluid valve 60 that is implemented downstream therefrom. For example, an upstream sensor 58A may determine sensor data indicative of fluid pressure present within the tubing annulus 25 of the pipe segment 20. Additionally or alternatively, an upstream sensor 58A may determine sensor data indicative of fluid temperature present within the tubing annulus 25 of the pipe segment.

On the other hand, one or more downstream sensors 58, such as a flow meter 58B and/or a fluid composition analyzer 58C, in a testing apparatus 40 may determine sensor data indicative of one or more fluid parameters on fluid released from one or more fluid conduits (e.g., free space) 24 in the tubing annulus 25 of a pipe segment while a fluid valve 60 that is implemented upstream therefrom is in its opened state. Merely as an illustrative non-limiting example, the fluid composition analyzer 58C may determine sensor data indicative of the fluid composition of fluid released from the one or more fluid conduits 24 in the tubing annulus 25 while the fluid valve 60 is in its opened state. Additionally, the flow meter 58B may determine sensor data indicative of fluid volume released from the one or more fluid conduits 24 in the tubing annulus 25 while the fluid valve 60 is in its opened state, for example, based at least in part on the fluid composition determined by the fluid composition analyzer 58C.

In some embodiments, operation of a fluid valve 60 in a testing apparatus 40 may be passively controlled. In other words, in such embodiments, the testing apparatus 40 may include a passively-operated fluid valve 60, such as a relief valve, for example, which automatically transitions from its closed state to its opened state when fluid pressure at its input side reaches a relief (e.g., upper) pressure threshold and automatically transitions from its opened state back to its closed state when the fluid pressure at its input side drops to a lower pressure threshold. Additionally or alternatively, operation of a fluid valve 60 in a testing apparatus 40 of a pipeline system 10 may be actively controlled by a control sub-system 64 in the pipeline system 10. In other words, in such embodiments, the testing apparatus 40 may include an actively-operated fluid valve 60, such as a solenoid valve, for example, which transitions between its opened state and its closed state based on control signals 66 received from the control sub-system 64.

Furthermore, in some embodiments, a control sub-system 64 may be dedicated to a testing apparatus 40 and, thus, included in the testing apparatus 40. However, in other embodiments, a control sub-system 64 may be implemented and/or operated to control operation of a pipeline system 10 as a whole. In other words, in such embodiments, the control sub-system 64 may be separate (e.g., external) from the testing apparatus 40.

In any case, to facilitate controlling operation, as in the depicted example, the control sub-system 64 may include one or more processors 68, memory 70, and one or more input/output (I/O) devices 72. In some embodiments, the memory 70 in the control sub-system 64 may include one or more tangible, non-transitory, computer-readable media that are implemented and/or operated to store data and/or executable instructions. For example, the memory 70 may store sensor data based at least in part on one or more sensor signals 74 received from a sensor 58. As such, in some embodiments, the memory 70 may include volatile memory, such as random-access memory (RAM), and/or non-volatile memory, such as read-only memory (ROM), flash memory, a solid-state drive (SSD), a hard disc drive (HDD), or any combination thereof.

Additionally, in some embodiments, a processor 68 in the control sub-system 64 may include processing circuitry that is implemented and/or operated to process data and/or to execute instructions stored in memory 70. In other words, in some such embodiments, a processor 68 in the control sub-system 64 may include one or more general purpose microprocessors, one or more application specific integrated circuits (ASICs), one or more field programmable gate arrays (FPGAs), or any combination thereof. For example, a processor 68 in the control sub-system 64 may execute instructions stored in memory 70 to determine a control signal 66 that instructs the fluid valve 60 in the testing apparatus 40A to transition from its closed state to its opened state or vice versa.

Additionally or alternatively, as will be described in more detail below, a processor 68 in the control sub-system 64 may process sensor data determined by the sensors 58 in a testing apparatus 40 to determine an integrity state of a pipe segment 20 and, thus, an integrity state of a pipeline system 10 in which the pipe segment 20 is deployed. For example, the control sub-system 64 may determine the integrity state of the pipe segment 20 based at least in part on sensor data indicative of when the fluid pressure within the tubing annulus 25 of the pipe segment 20 reaches a relief pressure threshold associated with a fluid valve 60 in the testing apparatus 40. As another example, the control sub-system 64 may determine the integrity state of the pipe segment 20 based at least in part on sensor data indicative of the percentage of fluid released from the tubing annulus 25 of the pipe segment 20 that is external environmental fluid, the percentage of the fluid released from the tubing annulus 25 that is bore fluid, whether the fluid released from the tubing annulus 25 includes corrosive fluid, whether the fluid released from the tubing annulus 25 includes a corrosion byproduct, or any combination thereof.

As a further example, the control sub-system 64 may determine a pipe parameter of the pipe segment 20 based at least in part on the sensor data determined by the testing apparatus 40 and determine the integrity state of the pipe segment 20 based at least in part on the pipe parameter of the pipe segment 20. In particular, as will be described in more detail below, the control sub-system 64 may determine the volume of free space (e.g., one or more fluid conduits 24) in the tubing annulus 25 of a pipe segment 20 based at least in part on sensor data indicative of fluid pressure present in the tubing annulus 25 before a fluid valve 60 in the testing apparatus 40 is transitioned to its opened state to vent the tubing annulus 25, fluid pressure present in the tubing annulus 25 after the fluid valve 60 is transitioned back to its closed state, and the volume of fluid released from the tubing annulus 25 as a result of the fluid valve 60 being in its opened state. The control sub-system 64 may then determine the integrity state of the pipe segment 20 based at least in part on whether the determined free space volume in the tubing annulus 25 of the pipe segment 20 differs from the free space volume determined at a different time and/or an expected (e.g., target and/or theoretical) free space volume, for example, by more than a difference threshold that facilitates accounting for measurement (e.g., sensor) error.

In any case, to enable communication outside of the control sub-system 64, in some embodiments, the I/O devices 72 of the control sub-system 64 may include one or more input/output (I/O) ports (e.g., terminals). Additionally, to facilitate communicating with a user (e.g., operator or service technician), in some embodiments, the I/O devices 72 of the control sub-system 64 may include one or more user output devices, such as an electronic display, which is implemented and/or operated to display a graphical user interface (GUI) that provides a visual representation of an integrity state of a pipe segment 20 and/or an integrity state of a pipeline system 10 in which the pipe segment 20 is deployed. Furthermore, in some embodiments, the I/O devices 72 of the control sub-system 64 may include one or more user input devices, such as a hard button, a soft button, a keyboard, a mouse, and/or the like. In any case, in this manner, a testing apparatus 40 may be implemented in a pipeline system 10 to facilitate determining an integrity state of a pipe segment 20 deployed in the pipeline system 10 online during operation of the pipeline system 10, which, at least in some instances, may facilitate improving pipeline operational efficiency and/or operational reliability, for example, by enabling faults occurring after deployment of the pipe segment 20 to be detected and ameliorated.

Figure 6:
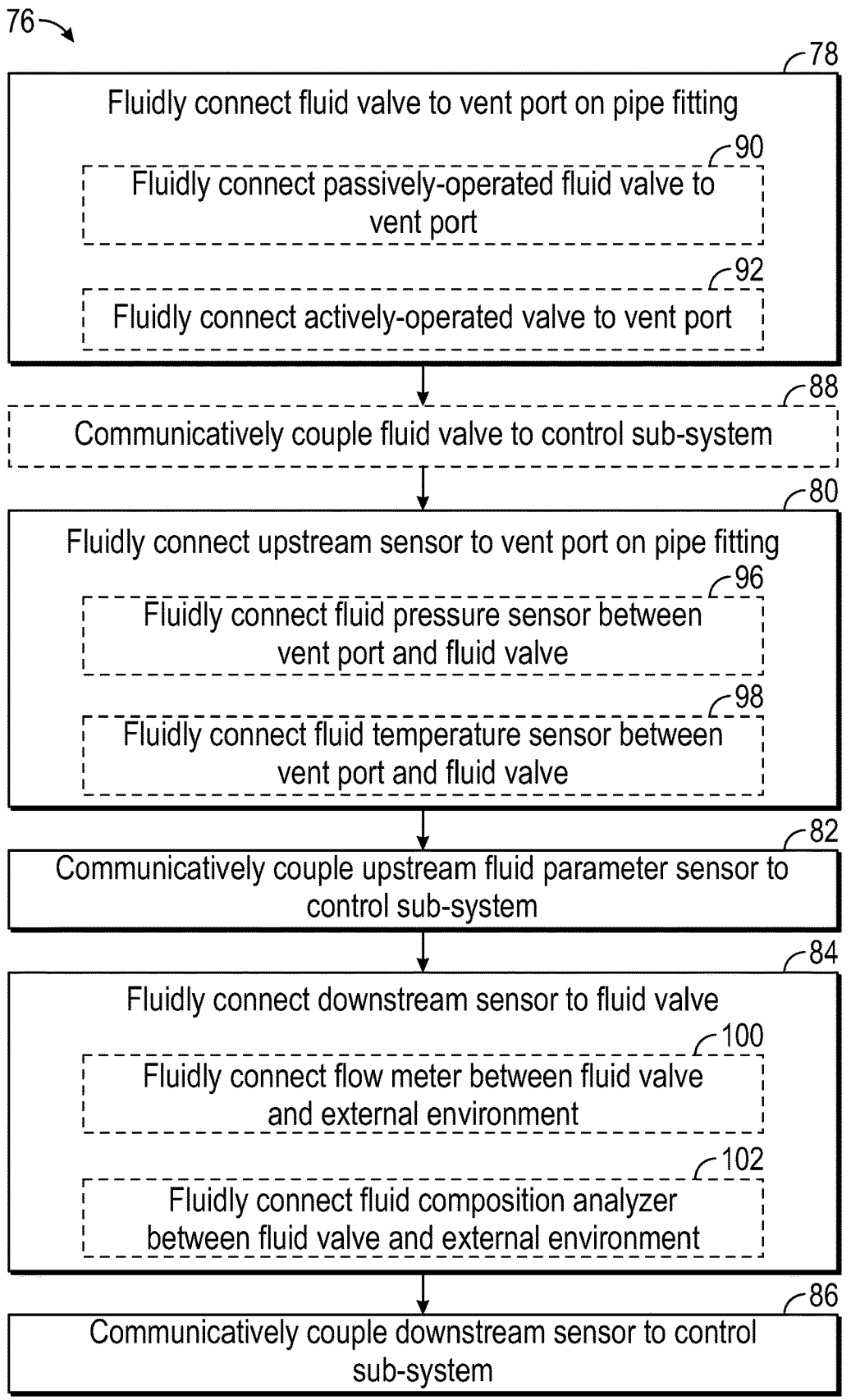
FIG. 6 is an example of a process for implementing a testing apparatus, in accordance with an embodiment of the present disclosure.

To help further illustrate, an example of a process 76 for implementing a testing apparatus 40 in a pipeline system 10 is described in FIG. 6. Generally, the process 76 includes fluidly connecting a fluid valve to a vent port on a pipe fitting (process block 78), fluidly connecting an upstream sensor to the vent port on the pipe fitting (process block 80), and communicatively coupling the upstream sensor to a control sub-system (process block 82). Additionally, the process 76 generally includes fluidly connecting a downstream sensor to the fluid valve (process block 84) and communicatively coupling the downstream sensor to the control sub-system (process block 86).

Although described in a specific order, which corresponds with an embodiment of the present disclosure, it should be appreciated that the example process 76 is merely intended to be illustrative and not limiting. In particular, in other embodiments, a process 76 for implementing a testing apparatus 40 in a pipeline system 10 may include one or more additional process blocks and/or omit one or more of the depicted process blocks. For example, some embodiments of the process 76 may additionally include communicatively coupling the fluid valve to the control sub-system (process block 88) while other embodiments of the process 76 do not. Moreover, in other embodiments, the depicted process blocks may be performed in a different order, for example, such that the upstream sensor is fluidly connected to the vent port on the pipe fitting before the fluid valve.

In any case, as described above, a testing apparatus 40 in a pipeline system 10 generally includes a fluid valve 60, which is implemented to be fluidly connected to a vent port 42 on a pipe fitting 18. As such, implementing the testing apparatus 40 may include fluidly connecting a fluid valve 60 to the vent port 42 on the pipe fitting 18, for example, via one or more external fluid conduits 62, such as a hose (process block 78). In particular, as described above, in some embodiments, a fluid valve 60 included in a testing apparatus 40 may be a passively-operated fluid valve 60, such as a relief fluid valve 60. Thus, in such embodiments, fluidly connecting a fluid valve 60 to a vent port 42 on a pipe fitting 18 may include fluidly connecting a passively-operated fluid valve 60 to the vent port 42 (process block 90).

However, as described above, in some embodiments, a testing apparatus 40 may additionally or alternatively include an actively-operated fluid valve 60, such as a solenoid fluid valve 60. Thus, in such embodiments, fluidly connecting a fluid valve 60 to a vent port 42 on a pipe fitting 18 may include fluidly connecting an actively-operated fluid valve 60 to the vent port 42 (process block 92). In fact, as mentioned above, in some embodiments, a testing apparatus 40 in a pipeline system 10 may include multiple fluid valves 60.

Figure 7:
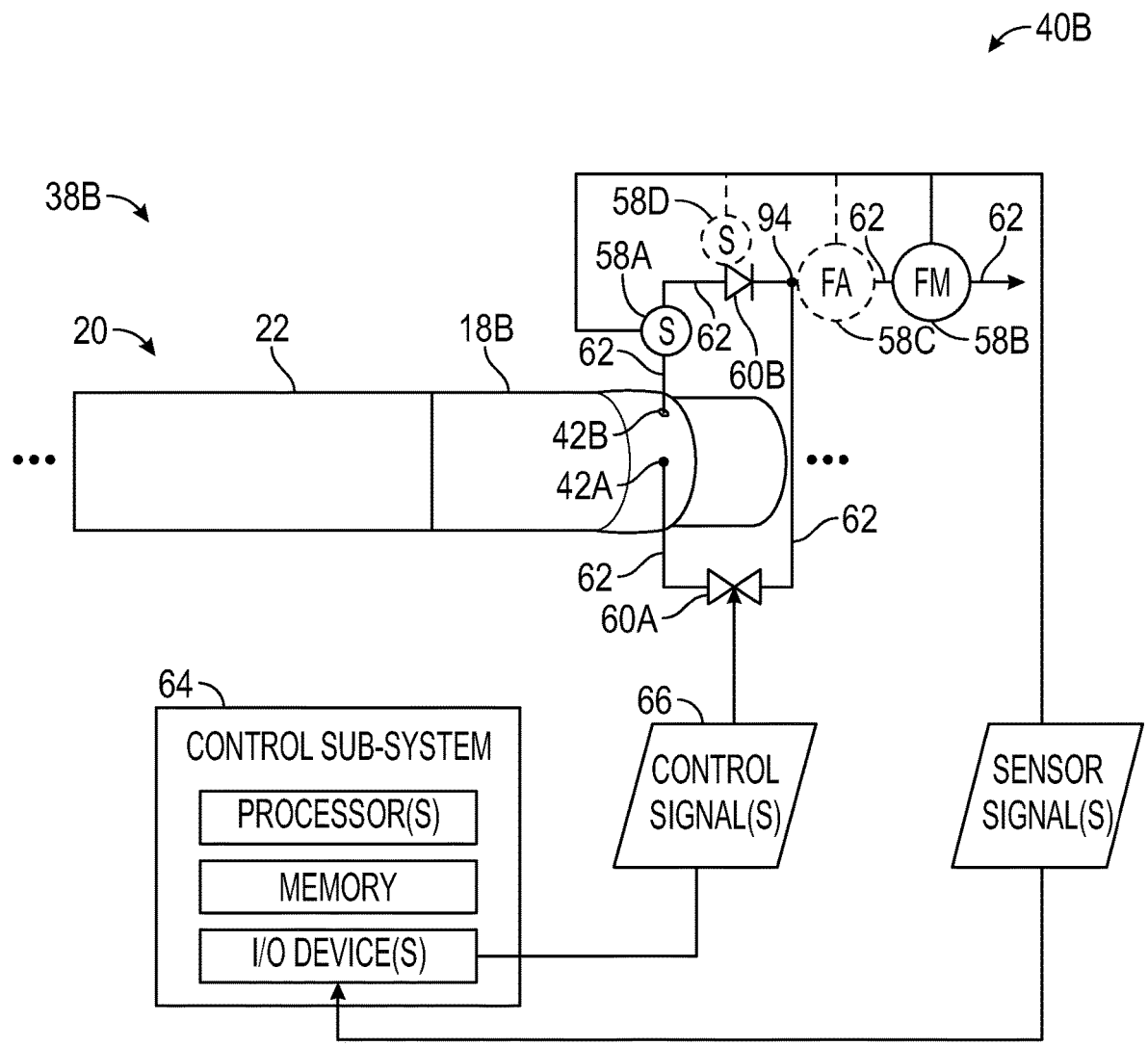
FIG. 7 is a block diagram of another example of the portion of the pipeline system of FIG. 1, which includes a testing apparatus, in accordance with an embodiment of the present disclosure.

To help illustrate, another example of a portion 38B of a pipeline system 10, which includes a testing apparatus 40B, is shown in FIG. 7. Similar to FIG. 4, as depicted in FIG. 7, the portion 38B of the pipeline system 10 additionally includes a pipe fitting 18B, a pipe segment 20 having tubing 22 secured in the pipe fitting 18, and a control sub-system 64. Furthermore, similar to FIG. 4, as depicted in FIG. 7, the testing apparatus 40B includes one or more upstream sensors 58A, such as a fluid pressure sensor 58 and/or a fluid temperature sensor 58, as well as one or more downstream sensors 58, such as a flow meter 58B and/or a fluid composition analyzer 58C. In fact, in some embodiments, the one or more upstream sensors 58A in the testing apparatus 40B of FIG. 7 may generally match the one or more upstream sensors 58A in the testing apparatus 40A of FIG. 4, the one or more downstream sensors 58 in the testing apparatus 40B of FIG. 7 may generally match the one or more downstream sensors 58 in the testing apparatus 40A of FIG. 4, the control sub-system 64 in the pipeline system 10 of FIG. 7 may generally match the control sub-system 64 in the pipeline system 10 of FIG. 4, or any combination thereof.

However, as depicted in FIG. 7, the testing apparatus 40B includes multiple fluid valves 60—namely an actively-operated fluid valve 60A and a passively-operated fluid valve 60B. Additionally, as depicted in FIG. 7, the pipe fitting 18 includes multiple vent ports 42—namely a first vent port 42A and a second vent port 42B. In particular, as depicted, an input-side of the actively-operated fluid valve 60A is fluidly connected to the first vent port 42A via one or more external fluid conduits 62, such as a hose, while the input-side of the passively-operated fluid valve 60B is fluidly connected to the second vent port 42B via one or more external fluid conduits 62, such as a hose. Additionally, as depicted, the output-side of the actively-operated fluid valve 60A is fluidly connected to a junction 94 between the output-side of the passively-operated fluid valve 60B and the one or more downstream sensors 58, thereby enabling the one or more downstream sensors 58 to determine fluid parameters of fluid released from the tubing annulus 25 of the pipe segment 20 regardless of whether the fluid is released via the actively-operated fluid valve 60A or the passively-operated fluid valve 60B.

Moreover, as in the depicted example, in some embodiments, the sensors 58 of a testing apparatus 40 may additionally include a valve position sensor 58D, which is implemented and/or operated to determine sensor data indicative of whether a corresponding (e.g., passively operated) fluid valve 60 is in its opened state or its closed state. In particular, in some such embodiments, a valve position sensor 58D may be integrated with a corresponding fluid valve 60. However, in other embodiments, a valve position sensor 58D and a corresponding fluid valve 60 may be implemented as separate components and, thus, the valve position sensor 58D may be secured to the fluid valve 60.

In any case, it should be appreciated that the depicted example is merely intended to be illustrative and not limiting. In particular, in other embodiments, one or more upstream sensors 58A in a testing apparatus 40 may be implemented upstream of an actively-operated fluid valve 60A, for example, instead of upstream of a passively-operated fluid valve 60B. Additionally or alternatively, in other embodiments, a passively-operated fluid valve 60B and an actively-operated fluid valve 60A in a testing apparatus 40 may be fluidly connected to the same vent port 42 on a pipe fitting 18.

In any case, as described above, an actively-operated fluid valve 60A in a testing apparatus may generally operate based on control signals 66 received from a control sub-system 64. For example, the control sub-system 64 may output a control signal 66 to the actively-operated fluid valve 60A that instructs the actively-operated fluid valve 60A to transition from its closed state to its opened state or vice versa. Thus, returning to the process 76 of FIG. 6, when a testing apparatus 40 includes an actively-operated fluid valve 60A, implementing the testing apparatus 40 in a pipeline system 10 may include communicatively coupling the actively-operated fluid valve 60A to a control sub-system 64 in the pipeline system 10 (process block 88).

In addition to one or more fluid valves 60, as described above, a testing apparatus 40 in a pipeline system 10 may include sensors 58. In particular, as described above, the testing apparatus 40 may include one or more sensors 58 implemented upstream of a fluid valve 60 in the testing apparatus 40. As such, implementing a testing apparatus 40 in a pipeline system 10 may include fluidly connecting one or more upstream sensors 58A to a vent port 42 on a pipe fitting 18 (process block 80). In other words, the testing apparatus 40 may be implemented such that the one or more upstream sensors 58A are fluidly connected between the vent port 42 and the fluid valve 60.

As described above, in some embodiments, the one or more upstream sensors 58A in a testing apparatus 40 may include a fluid pressure sensor 58. In other words, in such embodiments, fluidly connecting an upstream sensor 58A to a vent port 42 on a pipe fitting 18 may include fluidly connecting a fluid pressure sensor 58 between the vent port 42 and a fluid valve 60 in the testing apparatus 40, for example, via one or more external fluid conduits 62, such as a hose (process block 96). Additionally or alternatively, as described above, in some embodiments, the one or more upstream sensors 58A in a testing apparatus 40 may include a fluid temperature sensor 58. In other words, in such embodiments, fluidly connecting an upstream sensor 58A to a vent port 42 on a pipe fitting 18 may include fluidly connecting a fluid temperature sensor 58 between the vent port 42 and a fluid valve 60 in the testing apparatus 40, for example, via one or more external fluid conduits 62, such as a hose (process block 98).

In any case, as will be described in more detail below, a control sub-system 64 may determine an integrity state of a pipe segment 20 deployed in a pipeline system 10 based at least in part on sensor data determined by one or more sensors 58 in a testing apparatus 40 of the pipeline system 10. In other words, as described above, the sensors 58 in a testing apparatus 40 of a pipeline system 10 may be communicatively coupled to a control sub-system 64 in the pipeline system 10. As such, implementing a testing apparatus 40 in a pipeline system 10 may include communicatively coupling one or more upstream sensors 58A in the testing apparatus 40 to a control sub-system 64 in the pipeline system 10 (process block 82).

In addition to upstream sensors 58A, as described above, a testing apparatus 40 may include one or more sensors 58 implemented downstream of a fluid valve 60 in the testing apparatus 40. As such, implementing a testing apparatus 40 in a pipeline system 10 may include fluidly connecting one or more downstream sensors 58 to a fluid valve 60 in the testing apparatus (process block 84). In other words, the testing apparatus 40 may be implemented such that the one or more downstream sensors 58 are fluidly connected between the fluid valve 60 and external environmental conditions.

As described above, in some embodiments, the one or more downstream sensors 58 in a testing apparatus 40 may include a flow meter 58B. In other words, in such embodiments, fluidly connecting a downstream sensor 58 to a fluid valve 60 may include fluidly connecting a flow meter 58B between the fluid valve 60 and external environmental conditions (process block 100). Additionally or alternatively, as described above, in some embodiments, the one or more downstream sensors 58 in a testing apparatus 40 may include a fluid composition analyzer 58C. In other words, in such embodiments, fluidly connecting a downstream sensor 58 to a fluid valve 60 may include fluidly connecting a fluid composition analyzer 58C between the fluid valve 60 and external environmental condition, for example, such that the fluid composition analyzer 58C is implemented upstream of a flow meter 58B to enable the flow meter 58B to determine the volume of released fluid based at least in part on the composition of the released fluid determined by the fluid composition analyzer 58C (process block 102).

In any case, as will be described in more detail below, a control sub-system 64 may determine an integrity state of a pipe segment 20 deployed in a pipeline system 10 based at least in part on sensor data determined by one or more sensors 58 in a testing apparatus 40 of the pipeline system 10. In other words, as described above, the sensors 58 in a testing apparatus 40 of a pipeline system 10 may be communicatively coupled to a control sub-system 64 of the pipeline system 10. As such, implementing a testing apparatus 40 in a pipeline system 10 may include communicatively coupling one or more downstream sensors 58 in the testing apparatus 40 to a control sub-system 64 in the pipeline system 10 (process block 86). In this manner, a testing apparatus 40 may be implemented in a pipeline system 10 to enable the pipeline system 10 to determine an integrity state of a pipe segment 20 deployed in the pipeline system 10 online during operation of the pipeline system 10, which, at least in some instances, may facilitate improving pipeline operational efficiency and/or pipeline operational reliability, for example, by enabling a fault that occurs in the pipe segment 20 after initial deployment in the pipeline system 10 to be detected and ameliorated.

Figure 8:
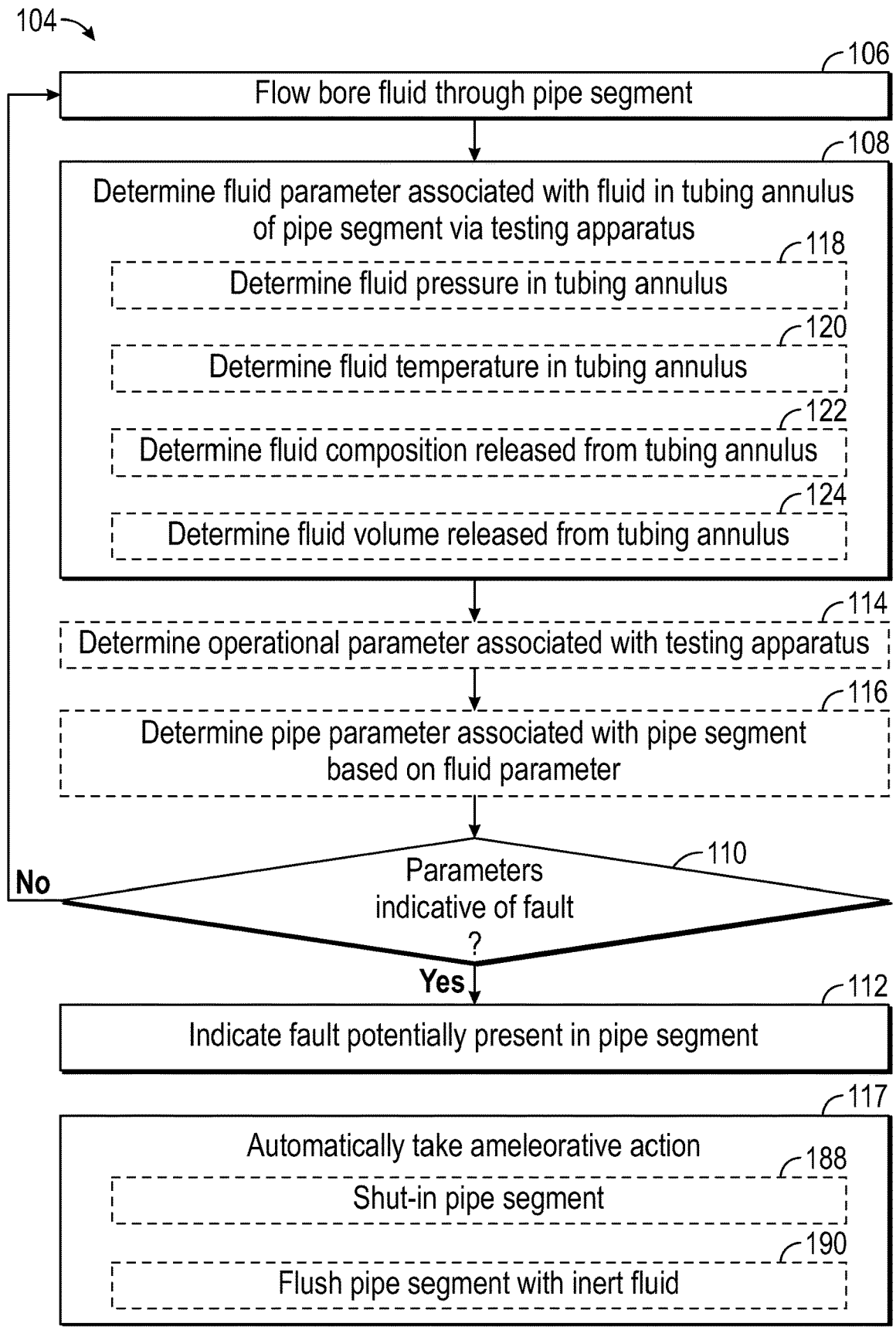
FIG. 8 is a flow diagram of an example process for operating a pipeline system, in accordance with an embodiment of the present disclosure.

To help further illustrate, an example of a process 104 for operating a pipeline system 10 that includes a testing apparatus 40 is described in FIG. 8. Generally, the process 104 includes flowing bore fluid through a pipe segment (process block 106) and determining a fluid parameter associated with fluid in a tubing annulus of a pipe segment via a testing apparatus (process block 108). Additionally, the process 104 generally includes determining whether determined parameters are indicative of a fault in the pipe segment (decision block 110) and indicating a fault is potentially present in the pipe segment when the determined parameters are indicative of a fault (process block 112).

Although described in a specific order, which corresponds with an embodiment of the present disclosure, it should be appreciated that the example process 104 is merely intended to be illustrative and not limiting. In particular, in other embodiments, a process 104 for operating a pipeline system 10 that includes a testing apparatus 40 may include one or more additional process blocks and/or omit one or more of the depicted process blocks. For example, some embodiments of the process 104 may additionally include determining an operational parameter associated with the testing apparatus (process block 114) while other embodiments of the process 104 do not. As another example, some embodiments of the process 104 may additionally include determining a pipe parameter associated with the pipe segment based on the fluid parameter (process block 116) while other embodiments of the process 104 do not. As a further example, some embodiments of the process 104 may include automatically taking an ameliorative action when the determined parameters are indicative of a fault (process block 117) while other embodiments of the process do not. Moreover, in some embodiments, the process 104 may be performed at least in part by executing instructions stored in tangible, non-transitory, computer-readable media, such as memory 70 in a control sub-system 64, using processing circuitry, such as a processor 68 in the control sub-system 64.

For example, in some such embodiments, a control sub-system 64 in a pipeline system 10 may instruct the pipeline system 10 to flow bore fluid through a pipe bore 32 of a pipe segment 20 deployed therein (process block 106). In particular, in some such embodiments, the control sub-system 64 may instruct a bore fluid pump 16 to pump bore fluid into the pipe bore 32 of the pipe segment 20 and/or to extract bore fluid from the pipe bore 32 of the pipe segment 20, for example, via one or more control signals 66. Nevertheless, in other embodiments, a pipeline system 10 may be manually operated, for example, by a user (e.g., operator and/or service technician) that manually controls operation of a bore fluid pump 16 in the pipeline system 10.

In any case, a testing apparatus 40 included in the pipeline system 10 may then be operated to facilitate determining one or more fluid parameters associated with fluid present within the tubing annulus 25 of the pipe segment 20 (process block 108). In other words, the testing apparatus 40 may operate to facilitate determining one or more fluid parameters that result in the tubing annulus 25 of the pipe segment 20 due at least in part to the flow of bore fluid through the pipe bore 32 of the pipe segment 20. To facilitate determining fluid parameters, as described above, a testing apparatus 40 in a pipeline system 10 may include sensors 58 that are fluidly connected to a vent port 42 on a pipe fitting 18, which is fluidly connected to free space (e.g., one or more fluid conduits 24) implemented in the tubing annulus 25 of the pipe segment 20 via a tubing cavity 50 in the pipe fitting 18.

In particular, as described above, a testing apparatus 40 in a pipeline system 10 may include one or more sensors 58, such as a fluid pressure sensor 58 and/or a fluid temperature sensor, that are fluidly connected upstream of a fluid valve 60 in the testing apparatus 40. Thus, in some embodiments, determining the one or more fluid parameters associated with the fluid in the tubing annulus 25 of the pipe segment 20 may include determining fluid pressure present within tubing annulus 25, for example, via an upstream fluid pressure sensor 58A (process block 118). Additionally or alternatively, determining the one or more fluid parameters associated with the fluid in the tubing annulus 25 of the pipe segment 20 may include determining fluid temperature present within the tubing annulus 25, for example, via an upstream fluid temperature sensor 58A (process block 120).

Furthermore, as described above, a testing apparatus 40 in a pipeline system 10 may include one or more sensors 58, such as flow meter 58B and/or a fluid composition analyzer 58C, that are fluidly connected downstream from a fluid valve 60 in the testing apparatus 40. Thus, in some embodiments, determining the one or more fluid parameters associated with the fluid in the tubing annulus 25 of the pipe segment 20 may include determining a fluid composition released from the tubing annulus 25 as a result of the fluid valve 60 being in its opened state (process block 122). Additionally or alternatively, determining the one or more fluid parameters associated with the fluid in the tubing annulus 25 of the pipe segment 20 may include determining a fluid volume released from the tubing annulus 25 as a result of the fluid valve 60 being in its opened position (process block 124). In fact, when fluid volume is determined using a mass-type measurement, in some embodiments, to facilitate improving determination accuracy, the fluid volume may be determined based at least in part on the fluid composition released from the tubing annulus 25.

In any case, based at least in part on the one or more fluid parameters determined by the testing apparatus 40, a control sub-system 64 in the pipeline system 10 may then determine an integrity state of the pipe segment 20 and, thus, the pipeline system 10. Thus, to facilitate determining the integrity state, the testing apparatus 40 may communicate sensor data indicative of the one or more fluid parameters to the control sub-system 64 via one or more sensor signals 74. The control sub-system 64 may then process the sensor data determined by the testing apparatus 40 to determine whether the sensor data is indicative of a fault (e.g., defect) potentially being present in the pipe segment 20 (decision block 110). For example, in some embodiments, the control sub-system 64 may process sensor data indicative of fluid pressure present within the tubing annulus 25 of the pipe segment 20 to determine whether a fault (e.g., breach and/or obstruction) is potentially present in the pipe segment 20.

Figure 9:
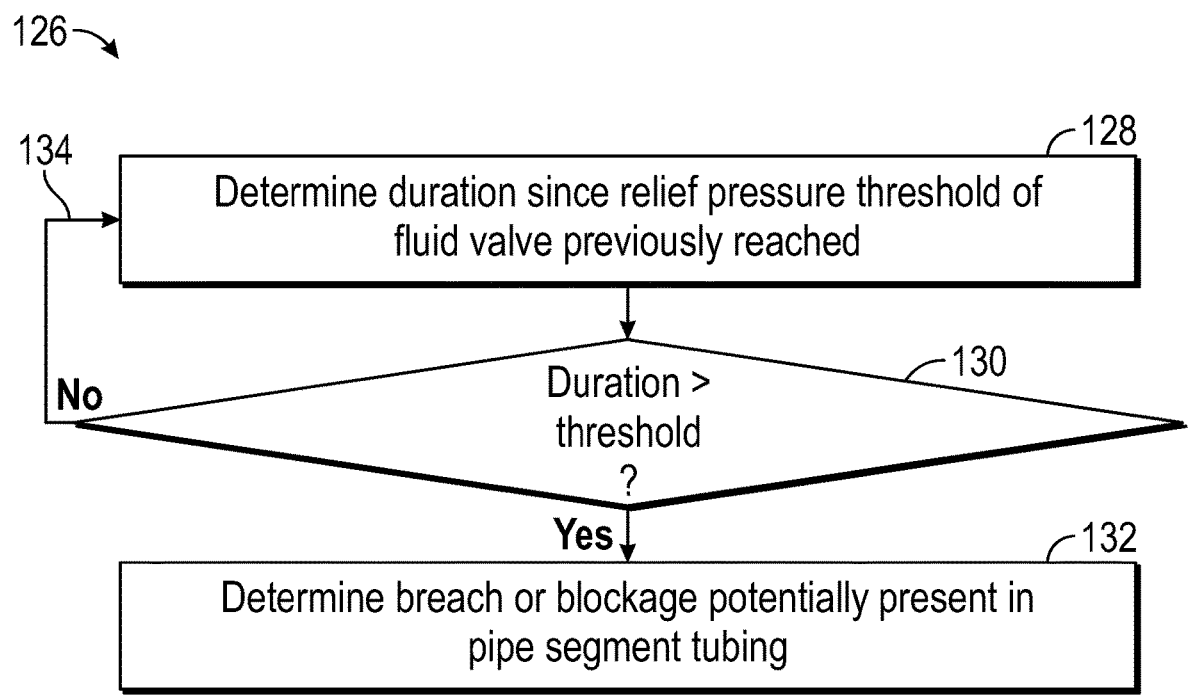
FIG. 9 is a flow diagram of an example of a process for determining an integrity state of a pipe segment, in accordance with an embodiment of the present disclosure.

To help illustrate, an example of a process 126 for determining an integrity state of a pipe segment 20 is described in FIG. 9. Generally, the process 126 includes determining a duration since a relief pressure threshold of a fluid valve was previously reached (process block 128) and determining whether the duration is greater than a duration threshold (decision block 130). Additionally, the process 126 generally includes determining that a breach or an obstruction is potentially present in tubing of a pipe segment when the duration exceeds the duration threshold (process block 132).

Although described in a specific order, which corresponds with an embodiment of the present disclosure, it should be appreciated that the example process 126 is merely intended to be illustrative and not limiting. In particular, in other embodiments, a process 126 for determining an integrity state of a pipe segment 20 may include one or more additional process blocks and/or omit one or more of the depicted process blocks. Moreover, in some embodiments, the process 126 may be performed at least in part by executing instructions stored in tangible, non-transitory, computer-readable media, such as memory 70 in a control sub-system 64, using processing circuitry, such as a processor 68 in the control sub-system 64.

For example, in some such embodiments, a control sub-system 64 in a pipeline system 10 may determine the duration since a relief (e.g., upper) pressure threshold associated with a fluid valve 60 in a testing apparatus 40 of the pipeline system 10 was previously reached in a tubing annulus 25 of a pipe segment 20 deployed in the pipeline system 10 (process block 128). In particular, to determine the duration since the relief pressure threshold was previously reached, in some embodiments, the control sub-system 64 may process sensor data determined by a fluid pressure sensor 58 implemented upstream of the fluid valve 60 to determine the fluid pressure present within the tubing annulus 25 of the pipe segment over time. In other words, in such embodiments, the control sub-system 64 may determine the duration since the relief pressure threshold was previously reached as the duration between a current time and a time associated with when the fluid pressure within the tubing annulus 25 previously reached the relief pressure threshold of the fluid valve 60.

Additionally or alternatively, the control sub-system 64 may determine the duration since the relief pressure threshold was previously reached based at least in part on sensor data determined by a valve position sensor 58D in the testing apparatus 40. As described above, a valve position sensor 58D in a testing apparatus 40 may determine sensor data indicative of the state of a corresponding fluid valve 60 and, thus, when the fluid valve 60 transitions from its closed state and its opened state. Additionally, as described above, in some embodiments, a fluid valve 60 in a testing apparatus 40 may be operated to transition from its closed state to its opened state when an associated relief pressure threshold is reached. Thus, in such embodiments, the control sub-system 64 may determine the duration since the relief pressure threshold was previously reached as the duration between a current time and a time associated with when the fluid valve 60 previously transitioned from its closed state to its opened state. In other words, returning to the process 104 of FIG. 8, to facilitate determining the integrity state, the control sub-system 64 may determine one or more operational parameters associated with the testing apparatus 40 based at least in part on sensor data determined by the testing apparatus 40 (process block 114).

In any case, returning to the process 126 of FIG. 9, the control sub-system 64 may then determine whether the duration since the relief pressure threshold was previously reached has exceeded a duration threshold, for example, by more than an error threshold that facilitates accounting for measurement (e.g., sensor) error (decision block 130). In some embodiments, the duration threshold may be set based on the excepted duration between successive times the relief pressure is reached when a fault is not present. Additionally, in some embodiments, the duration threshold may be predetermined and stored in tangible, non-transitory, computer-readable media, such as memory 70 in the control sub-system 64. Nevertheless, in some such embodiments, the predetermined duration threshold may be adaptively adjustable, for example, based at least in part on fluid temperature within the tubing annulus 25 of the pipe segment 20.

When the duration threshold has not yet been exceeded, the control sub-system 64 may continue monitoring (e.g., tracking) the duration since the relief pressure threshold associated with the fluid valve 60 was previously reached (arrow 134). On the other hand, when the duration since the relief pressure threshold was previously reached exceeds the duration threshold, the control sub-system 64 may determine that a breach or an obstruction (e.g., blockage) is potentially present in the tubing 22 of the pipe segment 20 (process block 132). In this manner, sensor data determined by a testing apparatus 40 in a pipeline system 10 may facilitate determining an integrity state of a pipe segment 20 deployed in the pipeline system 10.

However, it should be appreciated that the depicted example is merely intended to be illustrative and not limiting. In particular, in some embodiments, the integrity state of a pipe segment 20 may be determined based at least in part on one or more other fluid parameters associated with fluid present in the tubing annulus 25 of the pipe segment 20. For example, the integrity state of the pipe segment 20 may be determined based at least in part on one or more fluid parameters associated with fluid released from the tubing annulus 25 of the pipe segment 20.

Figure 10:
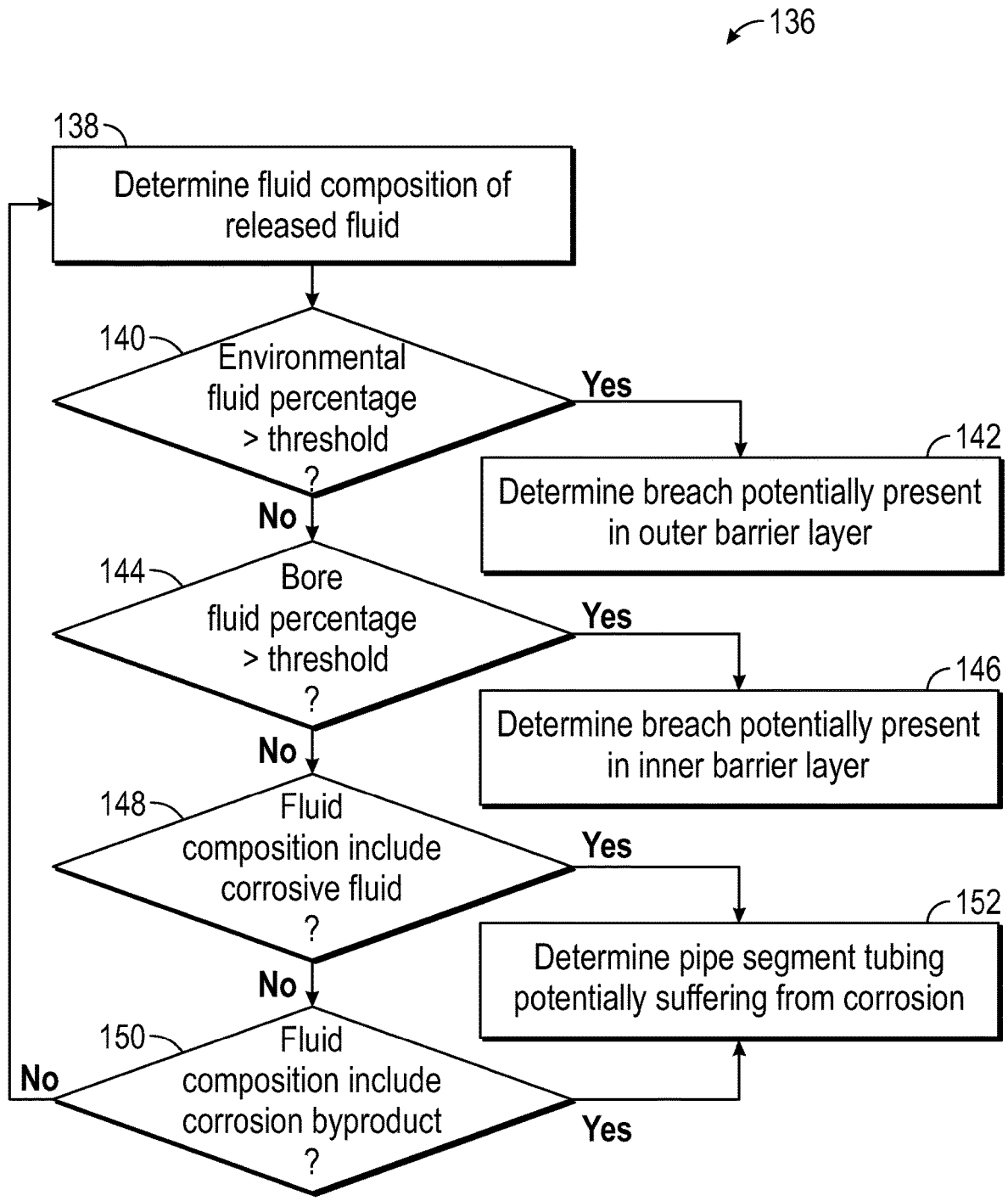
FIG. 10 is a flow diagram of another example of a process for determining an integrity state of a pipe segment, in accordance with an embodiment of the present disclosure.

To help illustrate, another example of a process 136 for determining an integrity state of a pipe segment 20 is described in FIG. 10. Generally, the process 136 includes determining fluid composition of released fluid (process block 138), determining whether percentage of external environment fluid in the released fluid is greater than a threshold percentage (decision block 140), and determining that a breach is potentially present in an outer barrier layer of a pipe segment when the percentage of external environment fluid in the released fluid is greater than the threshold percentage (process block 142). Additionally, the process 136 generally includes determining whether percentage of bore fluid in the released fluid is greater than another threshold percentage (decision block 144) and determining that a breach is potentially present in an inner barrier layer of a pipe segment when the percentage of bore fluid in the released fluid is greater than the other threshold percentage (decision block 146). Furthermore, the process 136 generally includes determining whether the fluid composition includes corrosive fluid (decision block 148), determining whether the fluid composition includes a corrosion byproduct (decision block 150), and determining that tubing of the pipe segment is potentially suffering from corrosion when the fluid composition includes corrosive fluid or a corrosion byproduct (process block 152).

Although described in a specific order, which corresponds with an embodiment of the present disclosure, it should be appreciated that the example process 136 is merely intended to be illustrative and not limiting. In particular, in other embodiments, a process 136 for determining an integrity state of a pipe segment 20 may include one or more additional process blocks and/or omit one or more of the depicted process blocks. Furthermore, in other embodiments, the depicted process blocks may be performed in a different order, for example, such that whether the fluid composition includes corrosive fluid and whether the fluid composition includes a corrosion byproduct are determined before determining whether the percentage of external environment fluid in the released fluid is greater than the threshold percentage. Moreover, in some embodiments, the process 136 may be performed at least in part by executing instructions stored in tangible, non-transitory, computer-readable media, such as memory 70 in a control sub-system 64, using processing circuitry, such as a processor 68 in the control sub-system 64.

For example, in some such embodiments, a control sub-system 64 in a pipeline system 10 may determine the fluid composition of fluid that is released from the tubing annulus 25 of a pipe segment 20 deployed in the pipeline system 10 based at least in part on sensor data determined by a testing apparatus 40 in the pipeline system 10 (process block 138). More specifically, the control sub-system 64 may determine the fluid composition of the fluid that is released from the tubing annulus 25 as a result of a fluid valve 60 in the testing apparatus 40 that is connected upstream of a fluid composition analyzer 58C in the testing apparatus 40 being in its opened state based at least in part on sensor data determined by the fluid composition analyzer 58C. In particular, the sensor data determined by the fluid composition analyzer 58C may be indicative of the percentage of one or more fluid components in the released fluid.

As such, based on the determined fluid composition, the control sub-system 64 may determine whether the percentage of fluid from the environmental conditions external to the pipeline system 10 in the released fluid is greater than a threshold environmental fluid percentage, for example, by more than an error threshold that facilitates accounting for measurement (e.g., sensor) error (decision block 140). At least in some instances, fluid from external environmental conditions may gradually permeate through the outer barrier layer 28 of a pipe segment 20 into free space (e.g., one or more fluid conduits 24) within the tubing annulus 25 of the pipe segment 20 at a predictable rate. Thus, in some embodiments, the threshold environmental fluid percentage may be set based at least in part on the amount of fluid that is expected to have permeated from the external environmental conditions into the tubing annulus 25. For example, the control sub-system 64 may determine whether the percentage of nitrogen in the released fluid is greater than a threshold nitrogen percentage that is set based at least in part on an expected permeation rate of nitrogen and the duration the pipe segment has been disposed in the external environmental conditions. Additionally or alternatively, the control sub-system 64 may determine whether the percentage of oxygen in the released fluid is greater than a threshold oxygen percentage that is set based at least in part on an expected permeation rate of oxygen and the duration the pipe segment has been disposed in the external environmental conditions.

The control sub-system 64 may similarly determine whether the percentage of fluid from the pipe bore 32 of the pipe segment 20 in the released fluid is greater than a threshold bore fluid percentage, for example, by more than an error threshold that facilitates accounting for measurement (e.g., sensor) error (decision block 144). At least in some instances, fluid from the pipe bore 32 of a pipe segment 20 may gradually permeate through the inner barrier layer 26 of the pipe segment 20 into free space (e.g., one or more fluid conduits 24) within the tubing annulus 25 of the pipe segment 20 at a predictable rate. Thus, in some embodiments, the threshold bore fluid percentage may be set based at least in part on the amount of bore fluid that is expected to have permeated from the pipe bore 32 into the tubing annulus 25 when a defect is not present in the tubing 20 of the pipe segment 20. For example, the control sub-system 64 may determine whether the percentage of bore fluid in the released fluid is greater than a threshold bore fluid percentage that is set based at least in part on an expected permeation rate of bore fluid through the inner barrier layer 26 of the pipe segment 20 and the duration the bore fluid has been present in the pipe bore 32 of the pipe segment 20.

However, in some instances, the permeation rate of different fluids through the inner barrier layer 26 of a pipe segment 20 may differ. For example, a first bore fluid (e.g., methane) may permeate through the inner barrier layer 26 into free space (e.g., one or more fluid conduits 240 in the tubing annulus 25 of the pipe segment 20 at a faster rate than a second bore fluid (e.g., water) and, thus, when a defect is not present in the tubing 20 of the pipe segment 20, fluid in the free space in the tubing annulus 25 may be expected to include a larger percentage of the first bore fluid than the second bore fluid even when more of the second bore fluid is present in the pipe bore 32 of the pipe segment 20 than the first bore fluid. Leveraging this fact, in some embodiments, different bore fluids released from the tubing annulus 25 of the pipe segment 20 may be compared against a corresponding threshold bore fluid percentage, for example, which is set based at least in part on an expected permeation rate of the bore fluid through the inner barrier layer 26 of the pipe segment 20 and the duration the bore fluid has been present in the pipe bore 32 of the pipe segment 20.

When the percentage of bore fluid in the released fluid is greater than a corresponding threshold bore fluid percentage, the control sub-system 64 may determine that bore fluid is permeating through the inner barrier layer 26 of the pipe segment 20 at a faster rate than expected. As such, the control sub-system 64 may determine that a breach (e.g., fault) is potentially present in the inner barrier layer 26 of the pipe segment 20 (process block 146). Similarly, when the percentage of external environment fluid in the released fluid is greater than a corresponding threshold environmental fluid percentage, the control sub-system 64 may determine that external environment fluid is permeating through the outer barrier layer 28 of the pipe segment 20 at a faster rate than expected. As such, the control sub-system 64 may determine that a breach (e.g., fault) is potentially present in the outer barrier layer 28 of the pipe segment 20 (process block 142).

Based on the determined fluid composition, the control sub-system 64 may additionally or alternatively determine whether the released fluid includes corrosive fluid (decision block 148). For example, the control sub-system 64 may determine whether the fluid composition of the released fluid includes hydrogen sulfide ($H_2S$). Furthermore, based on the determined fluid composition, the control sub-system 64 may additionally or alternatively determine whether the released fluid includes a corrosion byproduct (decision block 150). For example, the control sub-system 64 may determine whether the fluid composition of the released fluid includes hydrated iron(III) oxide ($Fe_2O_3.nH_2O$), iron(III) oxide-hydroxide ($Fe(OH)_3$), or both. When the fluid composition of the released fluid includes a corrosive fluid and/or a corrosion byproduct, the control sub-system 64 may determine that the tubing 22 of the pipe segment 20 is potentially suffering from corrosion. In this manner, sensor data determined by a testing apparatus 40 in a pipeline system 10 may facilitate determining an integrity state of a pipe segment 20 deployed in the pipeline system 10.

However, it should be appreciated that the depicted example is merely intended to be illustrative and not limiting. In particular, as mentioned above, in some embodiments, a control sub-system 64 in a pipeline system 10 may determine an integrity state of a pipe segment 20 deployed in the pipeline system 10 based at least in part on sensor data determined by a testing apparatus 40 in the pipeline system 10 to be indicative of fluid volume released from the tubing annulus 25 of the pipe segment 20. In particular, in some such embodiments, the control sub-system 64 may determine the volume of bore fluid released from the tubing annulus 25 of the pipe segment 20 based at least in on the sensor data determined by the testing apparatus 40 and determine the integrity state based at least in part on the volume of released bore fluid.

Figure 11:
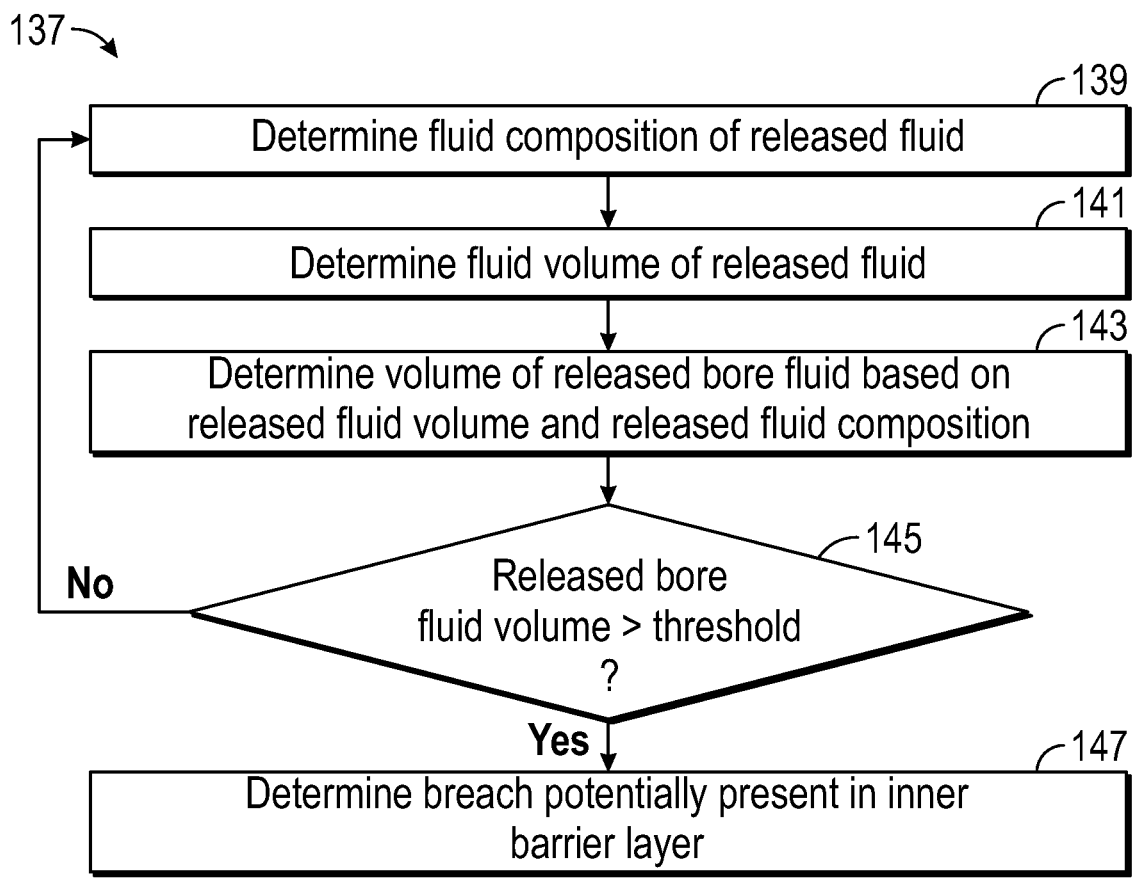
FIG. 11 is a flow diagram of a further example of a process for determining an integrity state of a pipe segment, in accordance with an embodiment of the present disclosure.

To help illustrate, a further example of a process 137 for determining an integrity state of a pipe segment 20 is described in FIG. 11. Generally, the process 137 includes determining a fluid composition of a released fluid (process block 139), determining a fluid volume of the released fluid (process block 141), and determining a volume of released bore fluid based on the fluid composition of the released fluid and the fluid volume of the released fluid (process block 143). Additionally, the process 137 generally includes determining whether the volume of released bore fluid is greater than a volume threshold (decision block 145) and determining that a breach is potentially present in an inner barrier layer of a pipe segment when the volume of released bore fluid is greater than the volume threshold (process block 147).

Although described in a specific order, which corresponds with an embodiment of the present disclosure, it should be appreciated that the example process 137 is merely intended to be illustrative and not limiting. In particular, in other embodiments, a process 137 for determining an integrity state of a pipe segment 20 may include one or more additional process blocks and/or omit one or more of the depicted process blocks. Additionally or alternatively, in other embodiments, the depicted process blocks may be performed in a different order, for example, such that the fluid volume of the released fluid is determined before the fluid composition of the released fluid. Moreover, in some embodiments, the process 137 may be performed at least in part by executing instructions stored in tangible, non-transitory, computer-readable media, such as memory 70 in a control sub-system 64, using processing circuitry, such as a processor 68 in the control sub-system 64.

For example, in some such embodiments, a control sub-system 64 in a pipeline system 10 may determine the fluid composition of fluid that is released from the tubing annulus 25 of a pipe segment 20 deployed in the pipeline system 10 based at least in part on sensor data determined by a testing apparatus 40 in the pipeline system 10 (process block 139). More specifically, the control sub-system 64 may determine the fluid composition of the fluid that is released from the tubing annulus 25 as a result of a fluid valve 60 in the testing apparatus 40 that is connected upstream of a fluid composition analyzer 58C in the testing apparatus 40 being in its opened state based at least in part on sensor data determined by the fluid composition analyzer 58C. In particular, the sensor data determined by the fluid composition analyzer 58C may be indicative of the percentage of one or more fluid components including bore fluid in the released fluid.

Additionally, the control sub-system 64 may determine the fluid volume of the fluid that is released from the tubing annulus 25 of the pipe segment 20 based at least in part on sensor data determined by the testing apparatus 40 in the pipeline system 10 (process block 141). More specifically, the control sub-system 64 may determine the fluid volume of the fluid that is released from the tubing annulus 25 as a result of the fluid valve 60 in the testing apparatus 40 that is connected upstream of a flow meter 58B in the testing apparatus 40 being in its opened state based at least in part on sensor data determined by the flow meter 58B. In fact, as mentioned above, to facilitate improving determination accuracy, in some embodiments, the fluid volume of the released fluid may be determined based at least in part on the fluid composition of the released fluid.

Based at least in part on the released fluid volume and the released fluid composition, the control sub-system 64 may then determine the volume of bore fluid that is included in the fluid released from the tubing annulus 25 of the pipe segment 20 (process block 143). In particular, the control sub-system 64 may determine the volume of released bore fluid at least in part by applying the percentage of bore fluid indicated in the determined fluid composition to the determined volume of the released fluid. For example, when the determined fluid composition indicates that the released fluid includes N % bore fluid, the control sub-system 64 may determine that the volume of released bore fluid is N % of the determined volume of the released fluid.

To facilitate determining the integrity state of a pipe segment 20, the control sub-system 64 may then determine whether the determined volume of released bore fluid is greater than a threshold bore fluid volume, for example, by more than an error threshold that facilitates accounting for measurement (e.g., sensor) error (decision block 145). As described above, at least in some instances, fluid from the pipe bore 32 of a pipe segment 20 may gradually permeate through the inner barrier layer 26 of the pipe segment 20 into free space (e.g., one or more fluid conduits 24) within the tubing annulus 25 of the pipe segment 20 at a predictable rate. Thus, in some embodiments, the threshold bore fluid volume may be set based at least in part on the volume of bore fluid that is expected to have permeated from the pipe bore 32 into the tubing annulus 25 when a defect is not present in the tubing 20 of the pipe segment 20. For example, the control sub-system 64 may determine whether the volume of released bore fluid is greater than a threshold bore fluid volume that is set based at least in part on an expected permeation rate of bore fluid through the inner barrier layer 26 of the pipe segment 20 and the duration the bore fluid has been present in the pipe bore 32 of the pipe segment 20.

When the determined volume of released bore fluid is greater than the threshold bore fluid volume, the control sub-system 64 may determine that bore fluid is permeating through the inner barrier layer 26 of the pipe segment 20 at a faster rate than expected. As such, the control sub-system 64 may determine that a breach (e.g., fault) is potentially present in the inner barrier layer 26 of the pipe segment 20 (process block 143). In this manner, sensor data determined by a testing apparatus 40 in a pipeline system 10 may facilitate determining an integrity state of a pipe segment 20 deployed in the pipeline system 10.

However, it should be appreciated that the depicted example is merely intended to be illustrative and not limiting. In particular, returning to the process 104 of FIG. 8, in some embodiments, a control sub-system 64 may determine a pipe parameter associated with a pipe segment 20 based at least in part on fluid parameters determined by a testing apparatus 40 (process block 116) and determine an integrity state of the pipe segment 20 based at least in part on the value of the pipe parameter. For example, in some such embodiments, the control sub-system 64 may determine the volume of free space (e.g., one or more fluid conduits 24) in the tubing annulus 25 of the pipe segment 20 based at least in part on the fluid parameters and determine the integrity state of the pipe segment 20 based at least in part on the determined free space volume.

Figure 12:
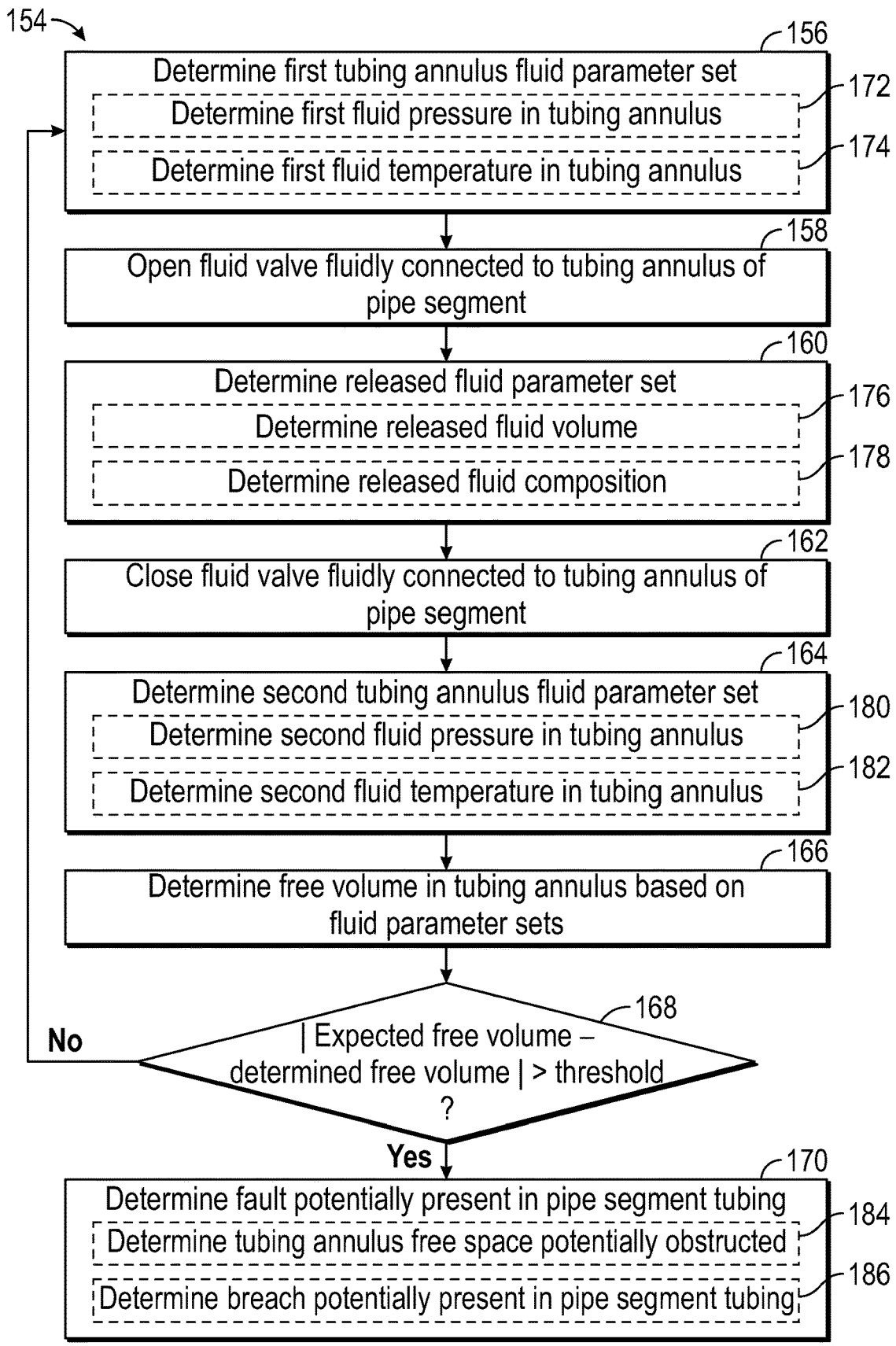
FIG. 12 is a flow diagram of another example of a process for determining an integrity state of a pipe segment, in accordance with an embodiment of the present disclosure.

To help illustrate, another example of a process 154 for determining an integrity state of a pipe segment 20 is described in FIG. 12. Generally, the process 154 includes determining a first tubing annulus fluid parameter set (process block 156), opening a fluid valve that is fluidly connected to a tubing annulus of a pipe segment (process block 158), and determining a released fluid parameter set (process block 160). Additionally, the process 154 generally includes closing the fluid valve that is fluidly connected to the tubing annulus of the pipe segment (process block 162) and determining a second tubing annulus fluid parameter set (process block 164). Furthermore, the process 154 generally includes determining free volume in the tubing annulus of the pipe segment based on the fluid parameter sets (process block 166), determining whether a difference between an expected free volume in the tubing annulus and the determined free volume in the tubing annulus differ by more than a threshold (decision block 168), and determining that a fault is potentially present in tubing of the pipe segment when the different between the expected free volume and the determined free volume is greater than the threshold (process block 170).

Although described in a specific order, which corresponds with an embodiment of the present disclosure, it should be appreciated that the example process 154 is merely intended to be illustrative and not limiting. In particular, in other embodiments, a process 154 for determining an integrity state of a pipe segment 20 may include one or more additional process blocks and/or omit one or more of the depicted process blocks. Moreover, in some embodiments, the process 154 may be performed at least in part by executing instructions stored in tangible, non-transitory, computer-readable media, such as memory 70 in a control sub-system 64, using processing circuitry, such as a processor 68 in the control sub-system 64.

For example, in some such embodiments, a control sub-system 64 in a pipeline system 10 may determine a first (e.g., previous) tubing annulus fluid parameter set, which includes one or more fluid parameters associated with fluid that is present within the tubing annulus 25 of a pipe segment 20 deployed in the pipeline system 10 (process block 156). In particular, the control sub-system 64 may determine the first tubing annulus fluid parameter set based at least in part on sensor data determined by one or more upstream sensors 58A in a testing apparatus 40 of the pipeline system 10 while each fluid valve 60 in the testing apparatus 40 is in its closed state. As described above, in some embodiments, the one or more upstream sensors 58A in a testing apparatus 40 may include a fluid pressure sensor 58 and/or a fluid temperature sensor 58. In other words, in such embodiments, determining the first tubing annulus fluid parameter set may include determining a first (e.g., previous) fluid pressure that is present within the tubing annulus 25 of the pipe segment 20 (process block 172) and/or determining a first (e.g., previous) fluid temperature that is present within the tubing annulus 25 of the pipe segment 20 (process block 174).

After the first tubing annulus fluid parameter set is determined, a fluid valve 60 in the testing apparatus 40 that is fluidly connected to the free space (e.g., one or more fluid conduits 24) within the tubing annulus 25 of the pipe segment 20 may then be operated to transition from its closed state to its opened state (process block 158). In particular, in some embodiments, the fluid valve 60 may transition from its closed state to its opened state in accordance with one or more control signals 66 received from the control sub-system 64. Additionally or alternatively, the fluid valve 60 may automatically transition from its closed state to its opened state in response to fluid pressure within the tubing annulus 25 of the pipe segment 20 exceeding a relief (e.g., upper) pressure threshold associated with the fluid valve 60. In any case, in this manner, fluid may be released from the tubing annulus 25 of the pipe segment 20, for example, into external environmental conditions.

The control sub-system 64 may then determine a released fluid parameter set, which includes one or more fluid parameters associated with the fluid that is released from the tubing annulus 25 of the pipe segment 20 (process block 160). In particular, the control sub-system 64 may determine the released fluid parameter set based at least in part on sensor data determined by one or more sensors 58 in the testing apparatus 40 that are implemented downstream of the fluid valve 60. As described above, in some embodiments, the one or more downstream sensors 58 in a testing apparatus 40 may include a flow meter 58B and/or a fluid composition analyzer 58C. In other words, in such embodiments, determining the released fluid parameter set may include determining the fluid volume of the released fluid (process block 176) and/or determining the fluid composition of the released fluid (process block 178). In fact, as mentioned above, to facilitate improving determination accuracy, in some embodiments, the fluid volume of the released fluid may be determined based at least in part on the fluid composition of the released fluid.

In any case, the fluid valve 60 in the testing apparatus 40 that is fluidly connected to the free space (e.g., one or more fluid conduits 24) within the tubing annulus 25 of the pipe segment 20 may then be operated to transition from its opened state back to its closed state (process block 162). In particular, in some embodiments, the fluid valve 60 may transition from its opened state to its closed state in accordance with one or more control signals 66 received from the control sub-system 64. Additionally or alternatively, the fluid valve 60 may automatically transition from its opened state to its closed state in response to fluid pressure within the tubing annulus 25 of the pipe segment 20 dropping below a lower pressure threshold associated with the fluid valve 60.

After the fluid valve 60 is transitioned back to its closed state, the control sub-system 64 may determine a second tubing annulus fluid parameter set, which includes one or more fluid parameters associated with fluid that is present within the tubing annulus 25 of the pipe segment 20 (process block 164). In particular, similar to the first tubing annulus fluid parameter set, the control sub-system 64 may determine the second tubing annulus fluid parameter set based at least in part on sensor data determined by the one or more upstream sensors 58A in the testing apparatus 40 of the pipeline system 10. In other words, in some embodiments, determining the second tubing annulus fluid parameter set may include determining a second (e.g., subsequent) fluid pressure that is present within the tubing annulus 25 of the pipe segment 20 (process block 180) and/or determining a second (e.g., subsequent) fluid temperature that is present within the tubing annulus 25 of the pipe segment 20 (process block 182).

Based on the first tubing annulus fluid parameter set, the released fluid parameter set, and the second tubing annulus fluid parameter set, the control sub-system 64 may then determine the volume of free space (e.g., one or more fluid conduits 24) that is present within the tubing annulus 25 of the pipe segment 20 (process block 166). For example, when fluid temperature in the tubing annulus 25 remains constant, the control sub-system 64 may determine that the volume of the free space in the tubing annulus 25 is the released (e.g., measured) fluid volume multiplied by a ratio of the second (e.g., subsequent) tubing annulus fluid pressure to the difference between the first (e.g., previous) tubing annulus fluid pressure and the second tubing annulus fluid pressure, for example, due to Boyle's law. Additionally, when fluid temperature in the tubing annulus 25 changes, the control sub-system 64 may nevertheless determine the volume of the free space in the tubing annulus 25, for example, in accordance with the combined gas law.

The control sub-system 64 may then determine whether a difference between an expected free space volume in the tubing annulus 25 and the determined free space volume in the tubing annulus 25 is greater than a difference threshold, for example, which facilitates accounting for measurement (e.g., sensor) error (decision block 168). In particular, in some embodiments, the expected volume of free space in the tubing annulus 25 may be theoretical value and, thus, predetermined and stored in tangible, non-transitory, computer-readable media, such as memory 70 in the control sub-system 64. Thus, in such embodiments, the control sub-system 64 may retrieve the value of the expected free space volume from the tangible, non-transitory, computer-readable media.

Additionally or alternatively, the expected free space volume in the tubing annulus 25 may be the value of the free space volume determined at a previous time. Thus, to facilitate subsequent integrity state determination, in some embodiments, the control sub-system 64 may store the determined free space volume in tangible, non-transitory, computer-readable media, such as memory 70 in the control sub-system 64. In other words, in such embodiments, the control sub-system 64 may nevertheless retrieve the value of the expected free space volume from the tangible, non-transitory, computer-readable media.

In any case, when the difference between the expected free space volume and the determined free space volume is greater than the difference threshold, the control sub-system 64 may determine that a fault is potentially present in the tubing 22 of the pipe segment 20 (process block 170). For example, when the expected free space volume is greater than the determined free space volume by more than the difference threshold, the control sub-system 64 may determine that the free space (e.g., one or more fluid conduits 24) in the tubing annulus 25 is potentially obstructed, for example, by pooled liquid, the outer barrier layer 28 of the pipe segment, and/or the inner barrier layer 26 of the pipe segment 20 (process block 184). Additionally, when the expected free space volume is less than the determined free space volume by more than the difference threshold, the control sub-system 64 may determine that a breach is potentially present in the tubing 22 of the pipe segment 20 (process block 186).

As described above, the process 126 of FIG. 9 may also facilitate determining whether a breach is potentially present in the tubing 22 of a pipe segment 20. However, at least in some instances, the pipe bore 32 of a pipe segment 20 and/or environmental conditions external to the pipe segment 20 may be pressurized (e.g., by water) such that fluid pressure within the tubing annulus 25 of the pipe segment 20 is nevertheless able to reach the relief pressure threshold associated with a fluid valve 60 in a testing apparatus 40 within a corresponding duration threshold. In other words, in some such instances, the process 126 of FIG. 9 may inadvertently miss a breach in pipe segment tubing 22 and, thus, the process 154 of FIG. 12 may also be performed (e.g., at a slower rate than the process 126 of FIG. 9) to facilitate further improving pipeline operational efficiency and/or pipeline operational reliability.

In any case, returning to the process 104 of FIG. 8, when the determined parameters (e.g., fluid parameters, operational parameters, and/or pipe parameters) are indicative of a fault, the control sub-system 64 may indicate to a user, such as an operator and/or a service technician, that a fault is potentially present in the pipe segment 20 and, thus, the pipeline system 10 (process block 112). For example, the control sub-system 64 may instruct an I/O device 72 to display a graphical user interface (GUI) that provides a visual indication that a fault is potentially present in the pipeline system 10. Additionally, in some embodiments, the control sub-system 64 may instruct an I/O device 72 to display a graphical user interface (GUI) that provides a visual indication of a potential location of a fault in the pipeline system 10, for example, as Global Positioning System (GPS) coordinates to a pipe fitting 18 to which a testing apparatus 40 that determined sensor data indicative of the fault is connected.

In fact, in some embodiments, when a potential fault is detected in a pipe segment 20 deployed in a pipeline system 10, a control sub-system 64 in the pipeline system 10 may automatically take one or more ameliorative actions (process block 117). Merely as an illustrative non-limiting example, in some such embodiments, the control sub-system 64 may automatically shut-in a pipe segment 20 that potentially has a fault, for example, when the control sub-system 64 determines that the fault is potentially a breach in the inner barrier layer 26 and/or the outer barrier layer 28 of the pipe segment 20. In particular, in such embodiments, the control sub-system 64 may automatically shut-in the pipe segment 20 at least in part by instructing a fluid valve, which is fluidly coupled upstream of the pipe bore 32 of the pipe segment 20, to transition from its opened state to its closed state (process block 188).

Additionally or alternatively, the control sub-system 64 may automatically flush (e.g., purge) the free space (e.g., one or more fluid conduits 24) in the tubing annulus 25 of a pipe segment 20, which potentially has a fault, using an inert fluid, such as nitrogen gas ($N_2$), for example, when the control sub-system 64 determines that the tubing 22 of the pipe segment 20 is potentially suffering from excessive corrosion (process block 190). In particular, in such embodiments, the control sub-system 64 may automatically flush the tubing annulus 26 of the pipe segment 20 at least in part by instructing an inert fluid source, which is fluidly connected to a vent port 42 on a pipe fitting 18 to which the free space in the tubing annulus 25 of the pipe segment 20 is fluidly connected, to supply inert fluid to the vent port 42 and, thus, the free space in the tubing annulus 25 of the pipe segment 20. In this manner, a testing apparatus may be implemented in a pipeline system to facilitate determining and/or improving an integrity state of a pipe segment deployed in the pipeline system and, thus, an integrity state of the pipeline system online during operation of the pipeline system, which, at least in some instances, may facilitate further improving operational efficiency and/or operational reliability of the pipeline system, for example, by enabling a fault that occurs after initial deployment of the pipe segment into the pipeline system to be detected and ameliorated.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system comprising:
   a pipe segment, wherein the pipe segment comprises tubing that defines a pipe bore through the pipe segment and one or more fluid conduits in a tubing annulus of the pipe segment;
   a pipe fitting secured to the pipe segment, wherein the pipe fitting comprises a vent port fluidly connected to the one or more fluid conduits in the tubing annulus of the pipe segment;
   a testing apparatus, wherein the testing apparatus comprises:
      a fluid valve fluidly connected to the vent port on the pipe fitting;
      an upstream sensor fluidly connected between the vent port on the pipe fitting and the fluid valve, wherein the upstream sensor is configured to determine a fluid parameter associated with fluid within the one or more fluid conduits in the tubing annulus of the pipe segment to facilitate determining an integrity state of the pipe segment; and
      a downstream sensor fluidly connected between the fluid valve and external environmental conditions, wherein the downstream sensor is configured to determine another fluid parameter associated with fluid released from the one or more fluid conduits in the tubing annulus of the pipe segment while the fluid valve is in an opened state to facilitate determining the integrity state of the pipe segment; and
   a control sub-system communicatively coupled to the downstream sensor and the upstream sensor in the testing apparatus, wherein:
      the upstream sensor comprises a fluid pressure sensor configured to determine first sensor data indicative of fluid pressure present within the one or more fluid conduits in the tubing annulus of the pipe segment;
      the downstream sensor comprises a flow meter configured to determine second sensor data indicative of fluid volume released from the one or more fluid conduits in the tubing annulus of the pipe segment while the fluid valve in the testing apparatus is in the opened state; and
      the control sub-system is configured to:
         determine free space volume in the tubing annulus of the pipe segment based at least in part on the first sensor data determined by the fluid pressure sensor and the second sensor data determined by the flow meter; and
         determine the integrity state of the pipe segment based at least in part on the free space volume in the tubing annulus of the pipe segment.

2. The pipeline system of claim 1, wherein:
   the pipe fitting comprises another vent port configured to be fluidly connected to the one or more fluid conduits in the tubing annulus of the pipe segment; and
   the testing apparatus comprises another fluid valve fluidly connected between the other vent port on the pipe fitting and a junction between an output side of the fluid valve and the downstream sensor.

3. The pipeline system of claim 2, wherein:
   the fluid valve in the testing apparatus comprises a relief fluid valve configured to:
      automatically transition from a closed state to the opened state when fluid pressure at an input side of the relief fluid valve exceeds a relief pressure threshold; and
      automatically transition from the opened state back to the closed state when the fluid pressure at the input side of the relief fluid valve drops below a lower pressure threshold; and
   the other fluid valve in the testing apparatus comprises a solenoid fluid valve configured to transition between the opened state and the closed state based at least in part on one or more control signals received from the control sub-system.

4. The pipeline system of claim 1, wherein:
   the upstream sensor comprises a fluid pressure sensor configured to determine sensor data indicative of fluid pressure within the tubing annulus of the pipe segment; and
   the control sub-system is configured to:
      determine a duration since a relief pressure threshold associated with the fluid valve in the testing apparatus has been reached based at least in part on the sensor data determined by the fluid pressure sensor; and
      determine the integrity state of the pipe segment based at least in part on whether the duration since the relief pressure threshold associated with the fluid valve in the testing apparatus has been reached exceeds a duration threshold.

5. The pipeline system of claim 4, wherein the control sub-system is configured to determine that a breach is potentially present in the tubing of the pipe segment when the duration since the relief pressure threshold associated with the fluid valve in the testing apparatus has been reached exceeds the duration threshold.

6. The pipeline system of claim 1, wherein:
the downstream sensor comprises a fluid composition analyzer configured to determine sensor data indicative of fluid composition of the fluid released from the one or more fluid conduits in the tubing annulus of the pipe segment while the fluid valve is in the opened state; and
the control sub-system is configured to determine the integrity state of the pipe segment based at least in part on the fluid composition of the fluid released from the one or more fluid conduits in the tubing annulus of the pipe segment.

7. The pipeline system of claim 6, wherein the control sub-system is configured to:
determine that a breach is potentially present in an outer barrier layer of the pipe segment when the fluid composition of the fluid released from the one or more fluid conduits in the tubing annulus of the pipe segment includes a percentage of external environment fluid that is greater than a threshold environmental fluid percentage; and
determine that a breach is potentially present in an inner barrier layer of the pipe segment when the fluid composition of the fluid released from the one or more fluid conduits in the tubing annulus of the pipe segment includes a percentage of bore fluid that is greater than a threshold bore fluid percentage.

8. The pipeline system of claim 6, wherein the control sub-system is configured to determine that the tubing of the pipe segment is potentially suffering from corrosion when the fluid composition of the fluid released from the one or more fluid conduits in the tubing annulus of the pipe segment includes a corrosive fluid, a corrosion byproduct, or both.

9. The pipeline system of claim 1, wherein the control sub-system is configured to:
determine that a breach is potentially present in the tubing of the pipe segment when the free space volume determined by the control sub-system is greater than an expected free space volume by more than a difference threshold; and
determine that an obstruction is potentially present in the one or more fluid conduits in the tubing annulus of the pipe segment when the free space volume determined by the control sub-system is less than the expected free space volume by more than the difference threshold.

10. The pipeline system of claim 1, wherein the testing apparatus comprises a fluid composition analyzer fluidly connected between the fluid valve and the flow meter, wherein:
the fluid composition analyzer is configured to determine third sensor data indicative of fluid composition released from the one or more fluid conduits in the tubing annulus of the pipe segment while the fluid valve is in the opened state; and
the flow meter is configured to determine the second sensor indicative of the fluid volume released from the one or more fluid conduits in the tubing annulus of the pipe segment based at least in part on the third sensor data determined by the fluid composition analyzer.

11. The pipeline system of claim 1, wherein the testing apparatus comprises a fluid temperature sensor fluidly connected between the vent port on the pipe fitting and the fluid valve of the testing apparatus, wherein:
the fluid temperature sensor is configured to determine third sensor data indicative of fluid temperature present within the one or more fluid conduits in the tubing annulus of the pipe segment; and
the control sub-system is configured to determine the free space volume in the tubing annulus of the pipe segment based at least in part on the first sensor data determined by the fluid pressure sensor, the second sensor data determined by the flow meter, and the third sensor data determined by the fluid temperature sensor.

12. The pipeline system of claim 1, wherein the control sub-system is configured to:
determine a first fluid pressure that is present within the one or more fluid conduits in the tubing annulus of the pipe segment based at least in part on the first sensor data that is determined by the fluid pressure sensor before the fluid valve in the testing apparatus transitions from a closed state to the opened state;
determine a fluid volume of the fluid released from the one or more fluid conduits in the tubing annulus of the pipe segment based at least in part on the second sensor data that is determined by the flow meter while the fluid valve in the testing apparatus is in the opened state;
determine a second fluid pressure that is present within the one or more fluid conduits in the tubing annulus of the pipe segment based at least in part on the first sensor data that is determined by the fluid pressure sensor after the fluid valve in the testing apparatus transitions from the opened state back to the closed state; and
determine the free space volume in the tubing annulus of the pipe segment based at least in part on the first fluid pressure in the tubing annulus of the pipe segment, the fluid volume released from the tubing annulus of the pipe segment, and the second fluid pressure in the tubing annulus of the pipe segment.

13. The pipeline system of claim 12, wherein the control sub-system is configured to determine the free space volume in the tubing annulus of the pipe segment at least in part by applying a ratio of the second fluid pressure in the tubing annulus of the pipe segment to a difference between the first fluid pressure in the tubing annulus of the pipe segment and the second fluid pressure in the tubing annulus to the fluid volume released from the tubing annulus of the pipe segment.

14. A method of operating a pipeline system, comprising:
determining, using a control sub-system in the pipeline system, a first tubing annulus fluid parameter set that includes one or more fluid parameters associated with fluid present within free space in a tubing annulus of a pipe segment deployed in the pipeline system based at least in part on sensor data determined by a testing apparatus in the pipeline system while a fluid valve in the testing apparatus is in a closed state;
transitioning the fluid valve in the testing apparatus from the closed state to an opened state to release fluid from the free space in the tubing annulus of the pipe segment;
determining, using the control sub-system, a released fluid parameter set that includes one or more fluid parameters associated with fluid released from the free space in the tubing annulus of the pipe segment based at least in part on sensor data determined by the testing apparatus while the fluid valve in the testing apparatus is in the opened state;
transitioning the fluid valve in the testing apparatus from the opened state back to the closed state;
determining, using the control sub-system, a second tubing annulus fluid parameter set that includes one or more fluid parameters associated with fluid present within the free space in the tubing annulus of the pipe segment based at least in part sensor data determined by the testing apparatus after the fluid valve in the testing apparatus is transitioned from the opened state back to the closed state; and determining, using the control sub-system, an integrity state of the pipeline system based at least in part on the first tubing annulus fluid parameter set, the released fluid parameter set, and the second tubing annulus fluid parameter set.

15. The method of claim 14, wherein determining the integrity state of the pipeline system comprises:

determining free space volume in the tubing annulus of the pipe segment based at least in part on the first tubing annulus fluid parameter set, the released fluid parameter set, and the second tubing annulus fluid parameter set;

determining that the free space in the tubing annulus of the pipe segment is potentially obstructed in response to determining that the free space volume determined by the control sub-system is less than an expected free space volume by more than a difference threshold; and determining that tubing of the pipe segment potentially has a breach in response to determining that the free space volume determined by the control sub-system is greater than the expected free space volume by more than the difference threshold.

16. The method of claim 15, wherein:

determining the first tubing annulus fluid parameter set comprises determining a first fluid pressure that is present in the tubing annulus of the pipe segment before the fluid valve in the testing apparatus is transitioned from the closed state to the opened state;

determining the released fluid parameter set comprises determining fluid volume of the fluid released from the free space in the tubing annulus of the pipe segment while the fluid valve in the testing apparatus is in the opened state;

determining the second tubing annulus fluid parameter set comprises determining a second fluid pressure that is present in the tubing annulus of the pipe segment after the fluid valve in the testing apparatus is transitioned from the opened state back to the closed state; and determining the free space volume in the tubing annulus of the pipe segment comprises applying a ratio of the second fluid pressure in the tubing annulus of the pipe segment to a difference between the first fluid pressure in the tubing annulus of the pipe segment and the second fluid pressure in the tubing annulus to the fluid volume of the fluid released from the tubing annulus of the pipe segment.

17. A testing apparatus in a pipeline system comprising:

an actively-operated fluid valve configured to be fluidly connected to a first vent port on a pipe fitting in the pipeline system, wherein the first vent port on the pipe fitting is configured to be fluidly connected to free space in a tubing annulus of a pipe segment deployed in the pipeline system;

a passively-operated fluid valve configured to be fluidly connected to a second vent port on the pipe fitting, wherein the second vent port on the pipe fitting is configured to be fluidly connected to the free space in the tubing annulus of the pipe segment;

a first one or more sensors fluidly connected upstream of the passively-operated fluid valve, wherein the first one or more sensors are configured to determine first sensor data indicative of one or more fluid parameters associated with fluid within the free space in the tubing annulus of the pipe segment at least in part by determining the first sensor data to indicate a first fluid pressure present in the tubing annulus of the pipe segment before fluid is released form the tubing annulus and a second fluid pressure present in the tubing annulus of the pipe segment after the fluid is released from the tubing annulus;

a second one or more sensors fluidly connected downstream of the actively-operated fluid valve and the passively-operated fluid valve, wherein the second one or more sensors are configured to determine second sensor data indicative of one or more fluid parameters associated with fluid released from the free space in the tubing annulus of the pipe segment at least in part by determining the second sensor data to indicate fluid volume of the fluid released from the tubing annulus of the pipe segment while the actively-operated fluid valve or the passively-operated fluid valve is in an open state; and a control sub-system communicatively coupled to the actively-operated fluid valve, the first one or more sensors, and the second one or more sensors, wherein the control sub-system is configured to determine an integrity state of the pipeline system based at least in part on the first sensor data determined by the first one or more sensors and the second sensor data determined by the second one or more sensors at least in part by:

determining free space volume in the tubing annulus of the pipe segment based at least in part on the first fluid pressure present in the tubing annulus of the pipe segment before the fluid is released form the tubing annulus, the fluid volume of the fluid released from the tubing annulus, and the second fluid pressure present in the tubing annulus of the pipe segment after the fluid is released from the tubing annulus; and determining the integrity state of the pipeline system based at least in part on whether the free space volume determined by the control sub-system differs from an expected free space volume by more than a difference threshold.

18. The testing apparatus of claim 17, wherein:

the first one or more sensors comprise a fluid pressure sensor and a fluid temperature sensor; and the second one or more sensors comprise a flow meter and a fluid composition analyzer.

* * * * *